United States Patent
Vermeir et al.

(10) Patent No.: US 7,592,764 B2
(45) Date of Patent: Sep. 22, 2009

(54) METHOD AND APPARATUS FOR DRIVING A DC MOTOR

(75) Inventors: Sam Vermeir, Mechelen (BE); Francois Laulanet, Brussels (BE); Bart Decock, Haacht (BE)

(73) Assignee: AMI Semiconductor Belgium BVBA, Oudenaarde (BE)

( * ) Notice: Subject to any disclaimer, the term of this patent is extended or adjusted under 35 U.S.C. 154(b) by 0 days.

(21) Appl. No.: 11/968,591

(22) Filed: Jan. 2, 2008

(65) Prior Publication Data

US 2008/0197794 A1 Aug. 21, 2008

(30) Foreign Application Priority Data

Jan. 2, 2007 (GB) .................................. 0700033.4

(51) Int. Cl.
*H02P 3/00* (2006.01)

(52) U.S. Cl. .................. 318/375; 318/372; 318/489

(58) Field of Classification Search ................. 318/375, 318/372, 400.34, 489, 599, 771, 798, 805, 318/400.05, 432, 434; 388/811
See application file for complete search history.

(56) References Cited

U.S. PATENT DOCUMENTS 6,160,368 A * 12/2000 Plutowski .................... 318/375
2005/0040880 A1* 2/2005 Plojhar et al. ............... 327/423

OTHER PUBLICATIONS

J.P.M. Bahlmann, "A Full-Wave Motor Drive IC Based On The Back-EMF Sensing Principle", Philips Consumer Electronics, Eindhoven, The Netherlands, 1989 IEEE, pp. 415-420.

Weizi Wang, Zhigan Wu, Wanbing Jin and Jianping Ying, "Sensorless Control Technology for Single Phase BLDCM Based on the Winding Time-Sharing Method", Delta Electronics (Shanghai) Co., Ltd., 2005 IEEE, pp. 1732-1736.

Gabriel Cimuca, Mircea M. Radulescu, Benoit Robyns and Stephane Brisset, Back-EMF Estimation Approach for Sensorless Operation of Small Electronically-Commutated Permanent-Magnet Motors, Proceedings of the 8th International Conference on Optimization of Electrical and Electronic Equipments (Brasov, May 16-17, 2002) 'Transilvania' University Press, Brasov, Romania, 2002, vol. II, pp. 509-512.

Longfu Luo and Ziya Wang, A Practical Microcomputer System for Single-Phase Brushless DC Motor, College of Electrical and Information Engineering, Hunan University, Changsha, 410082, P.R. China, pp. 1271-1274.

* cited by examiner

*Primary Examiner*—Karen Masih
(74) *Attorney, Agent, or Firm*—Workman Nydegger

(57) ABSTRACT

A circuit for determining a direction of rotation of an electric motor, the motor having asymmetry and/or eccentricity in a profile of back electromotive force as a function of angular position of a rotor with respect to a stator, the circuit receiving a signal representing the BEMF, and use the corresponding asymmetry and/or eccentricity in the signal to derive the direction of rotation. The signal representing the back emf can be generated by a control circuit. The control circuit can have a feedback loop regulator to generate a control signal (TL or TR) to control a current drive circuit (11,12) to control an amplitude of current ($i_w$) in the windings, the feedback loop regulator being arranged to compare the amplitude of the current ($i_w$) in the windings with a reference value ($i_{set}$), and use the control signal to provide the signal representing the back electromotive force.

21 Claims, 18 Drawing Sheets

(a) Tapered-air gap (b) Stepped-teeth (c) Asymmetric-teeth (d) Notched-teeth

METHOD AND APPARATUS FOR DRIVING A DC MOTOR

CROSS-REFERENCE TO RELATED APPLICATIONS

This patent application claims the benefit of British Patent Application Serial No. 0700033.4, filed Jan. 2, 2007, which patent application is incorporated herein by reference in its entirety.

FIELD OF THE INVENTION

The present invention relates in general to the control of a brushless DC motor and in particular to a method and an apparatus to control a brushless DC motor without position sensor e,g. hall sensor or optical encoder and determine the direction of rotation of the motor.

DESCRIPTION OF THE RELATED ART

It is known to the art how to determine the position of the rotor of permanent magnet motors and control those motors without a Hall sensor or any other position sensor. Such control schemes that do not require a position sensor are referred to as sensorless control schemes. A number of these sensorless control schemes rely on the back electromotive force (BEMF or back EMF). During operation of the motor, the windings see a time-varying magnetic field generated by the permanent magnet. That time varying magnetic field induces a back electromotive force (BEMF or back EMF) in the windings. The amplitude of the BEMF is a function of the position of the permanent magnet with respect to the windings.

In "A Full-Wave Motor Drive IC Based on The Back-EMF Sensing Principle" (IEEE Transactions On Consumer Electronics, Volume 35, Issue 3, August 1989, pages 415-420), the principle of back EMF sensing principle for control of three-phases DC motor is explained. When controlling three phases permanent magnet motors there are times when one phase (i.e. a winding or coil) is open-circuited and has no current flowing in it. Under such conditions, the terminal voltage is equal to the back EMF voltage and can be sensed directly. The current commutation moments are derived from the BEMF zero crossing points (or ZCP, points at which the BEMF changes polarity) in the floating motor winding.

Single phase motors do not have natural intervals when one phase is open circuited where the phase current remains zero for any length of time and the back EMF sensing approach is therefore not applicable. In U.S. Pat. No. 5,986,419 an additional winding, a so called quadrature axis winding, is provided to sense a BEMF signal. The quadrature axis winding is positioned in order not to be affected by the magnetic field generated by the stator winding. While the BEMF signal sensed at the terminals of the quadrature axis winding is not in phase with the BEMF signal induced in the stator winding, it can still be used to derive the commutation instants for the current in the stator winding. The solution proposed in U.S. Pat. No. 5,986,419 requires that the motor be fabricated or modified to accommodate an extra winding and therefore that solution cannot be used with the vast majority of single phase brushless DC motors.

Furthermore, the proposed method does not allow determination of the sense of rotation of the motor, a rather important parameter.

In "Sensorless Control Technology for Single Phase BLDCM Based on the Winding Time-Sharing Method" (ISBN O-7803-9252-3/05) Weizi Wang, et al. propose to use the stator windings of a single phase brushless DC motor both as a sensor and as a driving element, during most of the time in one control cycle, the stator windings are used as a driving component with load current to drive the rotation of the motor. During the rest of the time, the same stator windings are used the sense/detect the back electromotive force signal. Time sharing of the stator windings may however be a disadvantage and even become impossible when for instance access to the BEMF signal is desired at times when the stator windings are required for driving (b).

In "Back-EMF Estimation Approach for Sensorless Operation of Small Electronically Commutated Permanent Magnet Motors" (Proceedings of the $8^{th}$ International Conference on Optimization of Electrical and Electronic Equipments (Brasov, 16-17 May 2002) 'Transilvania' University Press, Brasov, Romania, 2002, Vol. II, pp. 509-512), Gabriel Cimuca, et al. propose to estimate the back emf signal by solving the set of first order differential equations describing the dynamic behavior of the motor using a finite difference scheme. This method requires knowledge of the characteristics of the motor (equivalent resistance and inductance of the windings of the motor). The estimation of the bemf will depend on the availability of the characteristics of the motor and/or the precision with which these characteristics are known (these characteristics may vary from one motor to another in a system destined to mass market commercialization) and therefore, estimation of the bemf signal is not always possible.

There remains a need for improving the art.

SUMMARY OF THE INVENTION

The present invention provides a control circuit for an electric motor, the electric motor comprising a rotor, a stator and windings, the control circuit having a feedback loop regulator to generate a control signal (TL or TR) to control a current drive circuit to control the amplitude of current ($i_w$) in the windings, the feedback loop regulator being arranged to compare the amplitude of the current ($i_w$) in the windings with a reference value ($i_{set}$), the control circuit also having circuitry to extract a characteristic (DC) of the control signal, said characteristic varying in function of time as the back electromotive force in the windings. The feedback loop regulator can be a Pulse Width Modulation Regulator.

Further, circuitry can be arranged to determine a rotational position of the electric motor based on a characteristic (DC) of the control signal.

Preferably circuitry is provided to determine time instants at which the direction of the current in the stator windings is be changed in function of the variation of a characteristic (DC) of the control signal.

Also circuitry to determine a direction of rotation of the motor from a characteristic (DC) of the control signal may be provided. This circuitry to determine a direction of rotation of the motor may comprise means to compute a rate of variation of a characteristic of the control signal.

The present invention also provides a method for determining the angular position of an electric motor, the motor having windings at a stator and a permanent magnet at the rotor, the amplitude of the current in the windings being controlled by a feedback loop regulator controlling a current drive circuit connected to the windings, the method comprising:

obtaining a characteristic (DC) of a control signal (TL, TR) generated by the feedback loop regulator; and monitoring the characteristic (DC) of the control signal.

The method may further comprise detecting a maximum in the monitored characteristic (DC) of the control signal. The detected maximum in the characteristic (DC) can be used to determine the instant at which to invert the direction of the current in the windings. This decision to invert the direction of the current in the windings can be taken when the characteristic (DC) has decreased by a given amount from the detected maximum.

The present invention also provides a method for determining a direction of rotation of an electric motor, the motor having windings at a stator and a permanent magnet at a rotor and having asymmetry and/or eccentricity in a profile of back electromotive force as a function of the angular position of the rotor of the motor with respect to the stator of the motor, the amplitude of the current in the windings being controlled by a feedback loop regulator controlling a current drive circuit connected to the windings, the method comprising:

obtaining a characteristic of a control signal generated by the feedback loop regulator at more than two instants in time.

The method may also include obtaining a first rate of variation of the characteristic of the control signal at a first instant in time, and obtaining a second rate of variation of the characteristic of the control signal at a second instant in time. The first rate of variation may be obtained before the occurrence of a maximum in the characteristic of the control signal and the second rate of variation may be obtained after the occurrence of a maximum in the characteristic of the control signal.

Optionally, the first rate of variation can be compared to the second rate of variation.

The invention may also provide a method to determine current commutation moments or states for a permanent magnet motor, e.g. a single phase brushless DC motor, without actual measurement of the BEMF signal across the terminals of motor windings. The invention proposes to determine cinematic quantities (angular displacement, angular speed) without a dedicated sensor.

The invention also provides a method to derive the direction of rotation of the rotor from the BEMF signal induced in the motor windings when the motor presents asymmetries (intentional or accidental) in its constitutive components that determine or influence the distribution of the magnetic field lines.

Embodiments of the invention are based, at least in part, on the realization that it is not necessary to directly measure/detect the BEMF waveform to take advantage of the information that the BEMF waveform contains to, among other things, determine the commutation instants of a brushless DC motor and/or determine the angular position and/or angular speed of the rotor. For instance, when the amplitude of the current in the stator windings is regulated by a feedback loop, the signal at the output of the regulator is a function of the BEMF signal and therefore the signal at the output of the regulator can be used to derive the moments at which direction of the current in the stator windings must be reversed. The same signal at the output of the regulator can be used to determine cinematic quantities (angular displacement, angular speed, angular acceleration). In some instances the signal at the output of said regulator can also be used to determine the direction of rotation of the rotor. In particular, when the regulator uses pulse width modulation (PWM) to control the current in the stator windings, the waveform of the BEMF influences the duty cycle of the PWM signal. As a consequence, the commutation moments i.e. the time at which the direction of the current in the stator windings must be changed/reversed can be derived from the duty cycle of the signal that controls the amplitude of the current in the stator windings. Hence the same circuit that is used to control the current in the windings of the stator is also used to extract or derive information concerning the BEMF waveform (and as a consequence, information concerning the speed, the position and the sense of rotation of the rotor) without the need for dedicated sensing circuitry as in the known art.

The invention also provides a method to derive the back electromotive force (and/or characteristics of the back electromotive force signal) induced in the windings of an electric motor. The electric motor comprises a rotor, a stator and windings 15. The amplitude of the current ($i_w$) in the windings is determined by a control signal (TL or TR) applied to a control electrode of a transistor switch said transistor switch being connected to said windings. Said control signal being generated by a feedback loop regulator that compares the amplitude of the current ($i_w$) in the windings with a reference value ($i_{set}$). The characteristics of the back electromotive force are derived from the control signal. In particular, the feedback loop regulator is a Pulse Width Modulation Regulator. In that case, the back electromotive force (and/or characteristics of the back electromotive force signal) may be derived from the duty cycle of the control signal. While the invention applies to various types of electric motors, it is advantageously used with motors that have windings at the stator and a permanent magnet at the rotor (e.g. brushless DC motors). Based on the back electromotive force and/or characteristics of the back electromotive force signal, it is possible to determine the position of the rotor (e.g. by detection of the zero crossing points of the bemf) and hence the commutation moments for a brushless DC motor.

According to an aspect of this invention a method and circuits are proposed to determine the direction of rotation of an electric motor. As Longfu Luo and Ziya Wang discuss in "A Practical Microcomputer System For Single-Phase Brushless DC Motor," single phase motors suffer from the so called "dead point" problem, in some positions, the torque of the motor is zero which makes it difficult to start sometimes. To solve that problem, the pole shoes of the stator ferromagnetic material can be shaped eccentrically or asymmetrically (see an example on FIG. 1). As discussed in US 2006/0197478 A1, the same result can be obtained with a tapered air-gap (see FIG. 2), stepped teeth (see FIG. 3), asymmetric teeth (see FIG. 4) or notched teeth (see FIG. 5). An aspect of the present invention is based on the realization that the shape of pole shoes at the stator are reflected in the BEMF waveform induced in the stator windings during rotation of the rotor permanent magnet and that the resulting waveform of the BEMF can be used to determine the direction of rotation of the rotor and determine the time instant where commutation of the current in the stator windings should be done (i.e. where the direction of the current in the stator windings must be changed).

The BEMF waveform is generally assumed to be sinusoidal (see FIG. 6) or trapezoidal with a flat top (see FIG. 7) and departure from these shapes are considered to be disturbances that must be compensated for to guarantee that the motor will be controlled adequately.

For instance in U.S. Pat. No. 6,577,085 B2, it is noted that when a permanent magnet motor exhibits a magnet dissymmetry or is magnetically deformed or if the mechanical symmetry of the stator is not exactly the same as that of the rotor, the electric position of the rotor derived from zero crossing of the back EMF is not steady in time even though the rotor speed is steady. U.S. Pat. No. 6,577,085 B2 proposes a solution to compensate for the magnetic and mechanical dissymmetry.

An example of a BEMF waveform that is not sinusoidal or trapezoidal with a flat top can be seen on FIG. 8 and FIG. 9 as it was measured by the applicant on a general purpose single phase brushless DC motor with a tapered air gap. FIGS. 8 and 9 give the BEMF signal in function of the angular position of the rotor (at a substantially constant rotation speed). As expected, the BEMF signal has a trapezoidal shape but instead of being flat, the top of the trapezoid has a non zero slope which reflects the fact that the air gap is tapered. The waveforms on FIGS. 8 and 9 correspond to opposite direction of rotation for the rotor. After research and experimentation carried out on different types of motors in different operating conditions, the inventors came to the conclusion that both senses of rotation of the rotor could be discriminated by monitoring the slope of the top BC (or the bottom B'C') of the trapezoid ABCD (DB'C'D') as the rotor turns (see FIGS. 10A and 10B). As is known from the art, e.g. U.S. Pat. No. 6,577,085 B2, any brushless DC motor may, accidentally or not, exhibit a magnet dissymmetry or be magnetically deformed or the mechanical dissymmetry of the stator is not exactly the same as that of the rotor. This is not restricted to brushless DC motor with intentional eccentricity or dissymmetry of the magnetic circuit (in particular intentional eccentricity or dissymmetry of the pole shoe at the stator) but also applies to motor that accidentally exhibits such eccentricity or dissymmetry. While for the sake of clarity the discussion will be conducted for a single phase brushless DC motor, the invention may also be applied with some advantage to brushless DC motors with two or more phases at the stator.

The electric motor comprises a stator and a rotor, one or more set of windings and presents accidental or intentional asymmetry and/or eccentricity (e.g. dissymmetry or deformation of the permanent rotor magnet, deformed stator or mechanical dissymmetry between stator and rotor) that influences the variation of the back electromotive force induced in said windings in function of the angular position of the rotor with respect to the stator. The motor can be a single phase brushless DC motor with a tapered air-gap as seen on FIG. 11. The stator windings (111) (112) are wound around pole shoes (113) (114). The rotor (115) comprises a permanent magnet. The angular position of the rotor (115) is the angle θ (118) between an axis of reference (117) that is fixed with respect to the stator (116) and the North-South axis (119) of the stator magnet. The axis of reference (117) is chosen so that θ is equal to 0 (or an integer multiple of Π) when the North-South axis of the rotor permanent magnet is aligned with the magnetic field generated by the stator windings. As seen on FIG. 11, the air gap between the rotor (115) and the pole shoes (113) and (114) is tapered. The tapered air gap may be intentional or accidental. The tapered air gap introduces an asymmetry in the distribution of the induction field lines and/or the local amplitude of the magnetic field that may help solve the "dead point" problem that was briefly discussed earlier. The asymmetry of the amplitude of the BEMF signal resulting from e.g. a tapered air gap may be defined in mathematical terms as follows: the BEMF signal will be said to be asymmetric if the graph of the amplitude of the BEMF signal in function of the angular position θ of the rotor is not symmetrical (even at constant speed of rotation) with respect to an axis $\theta=k*\pi$ (with k being an integer number). For instance, one sees on FIG. 10A that the graph of the amplitude of the BEMF signal in function of the angular position of the rotor is not symmetrical with respect to the axis θ=π. On the other hand, if the segments BC and B'C' had been parallel with the axis Theta (i.e. θ), the graph would have been symmetrical with respect to the axis θ=π.

The asymmetry discussed here results e.g. from skewed magnetic design, accidental or intentional asymmetry of the mechanical elements (rotor or stator, e.g. tapered air-gap), accidental or intentional misalignment of the rotor with respect to the stator, etc.

The method comprises the measurement of a signal that is either the back electromotive force or any other electrical signal that is a function of the back electromotive force and that reflects said asymmetry and/or eccentricity.

The method is further characterized in that the slope of the amplitude of the signal at one or more moments in time is detected or derived to determine the direction of rotation of the motor. The method is further characterized in that the slope of the amplitude of the signal at a first moment in time is compared with the slope of the amplitude of the signal at a second moment in time. The method is further characterized in that an average value of the slope of the signal around a first moment in time is compared with an average value of the slope of the amplitude of the signal around a second moment in time.

The method is further characterized in that the first and second moment in time are at or near a maximum of the amplitude of the signal. In particular, the first moment in time is before a maximum of the amplitude of the signal and the second moment in time is after said maximum. The signal used to determine the direction of rotation may be a signal that is function of the bemf and that reflects or follows the variation of the bemf. For instance the signal may be the output of a regulator controlling the amplitude of the current in the electric motor. In particular, the signal is the duty cycle of a PWM regulator.

While the method may be applied to various types of electric motors, it is advantageously used for electric motors that have windings at the stator and a permanent magnet at the rotor, e.g. brushless DC motors.

DESCRIPTION OF EMBODIMENTS

In the following, the acronym BEMF will designate the back electromotive force. Together with BEMF either back emf or BEMF signal will be used to refer to the back electromotive force signal. The following convention will be used when describing the state of a switch and in particular transistor switch. The transistor (switch) will be said to be closed (as if it were a normal mechanical switch) when it allows current to flow through it. In other words, when the transistor switch is closed it is conducting. The transistor (switch) is then switched ON. The transistor (switch) will be said to be opened when it does not allow current to flow through it. In other words, when the transistor switch is opened it is not conducting. The transistor (switch) is then said to be switched OFF.

Driving a permanent magnet brushless motor usually requires a knowledge of the BEMF signal (and/or characteristics of the back electromotive force signal) and in particular the moments at which the BEMF signal cancels and changes sign (the so called BEMF zero crossing points). An explanation is now provided by way of examples of how the BEMF signal (and/or characteristics of the back electromotive force signal) can be derived from a signal that controls the motor, followed by an explanation of how the zero crossing points can be anticipated/determined based on that signal controlling the motor. Also the direction of rotation of the motor can be determined from the same signal when the BEMF signal presents an asymmetry as discussed in the above.

Figure 12:
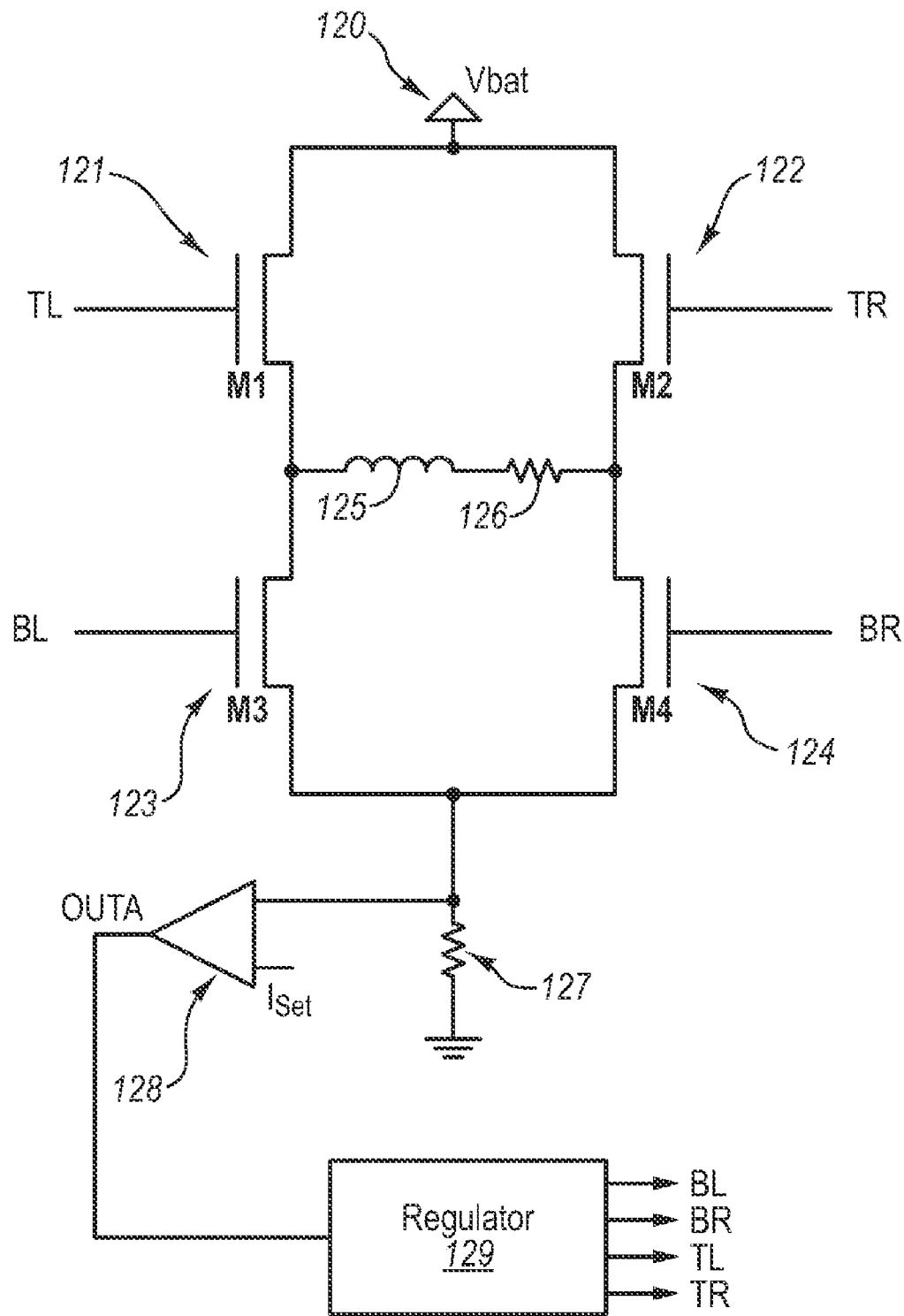
FIG. 12—Example of H-bridge and feedback loop to control the direction and the amplitude of the current in an electric motor.
Figure 13:
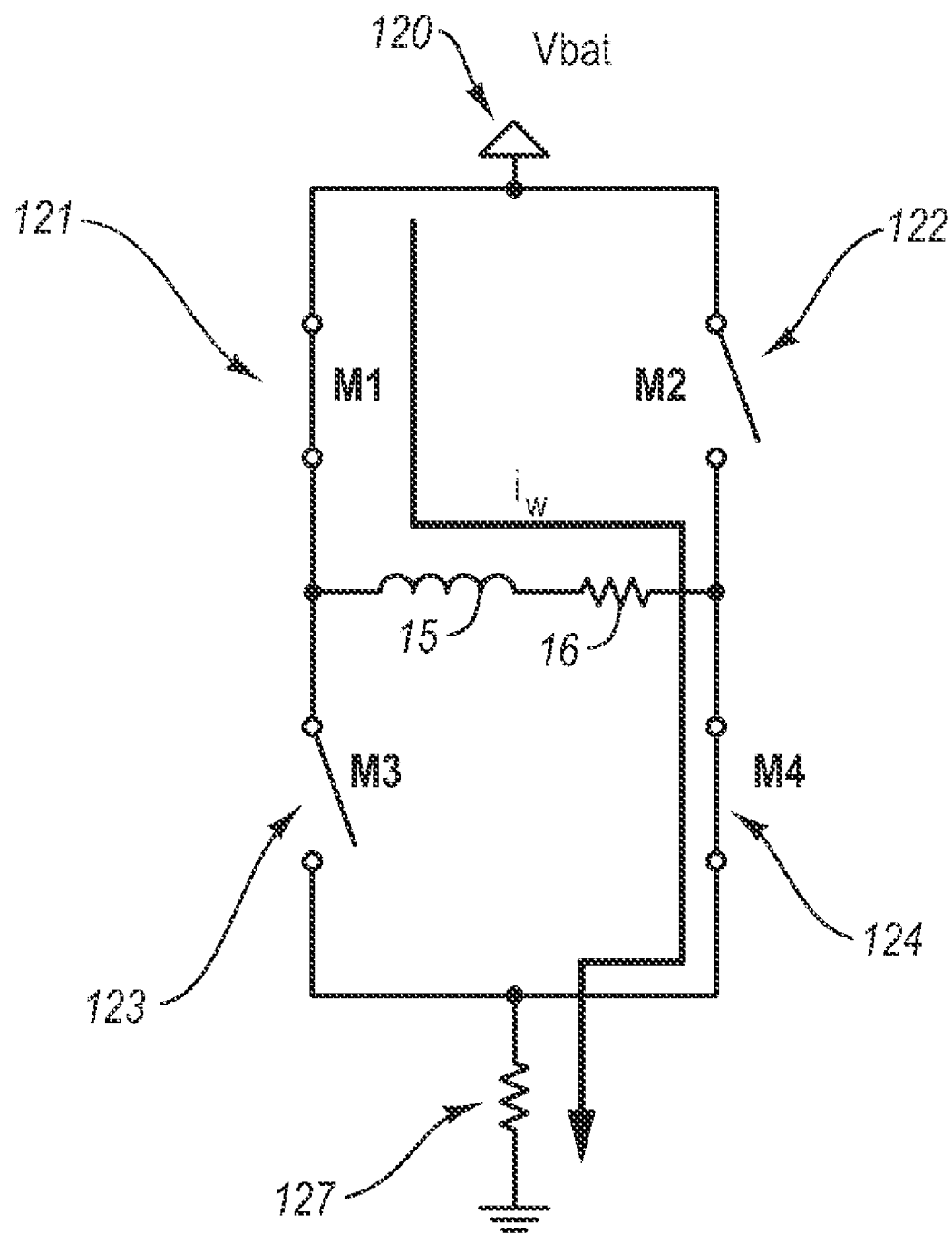
FIG. 13—First configuration of the H-bridge.
Figure 14:
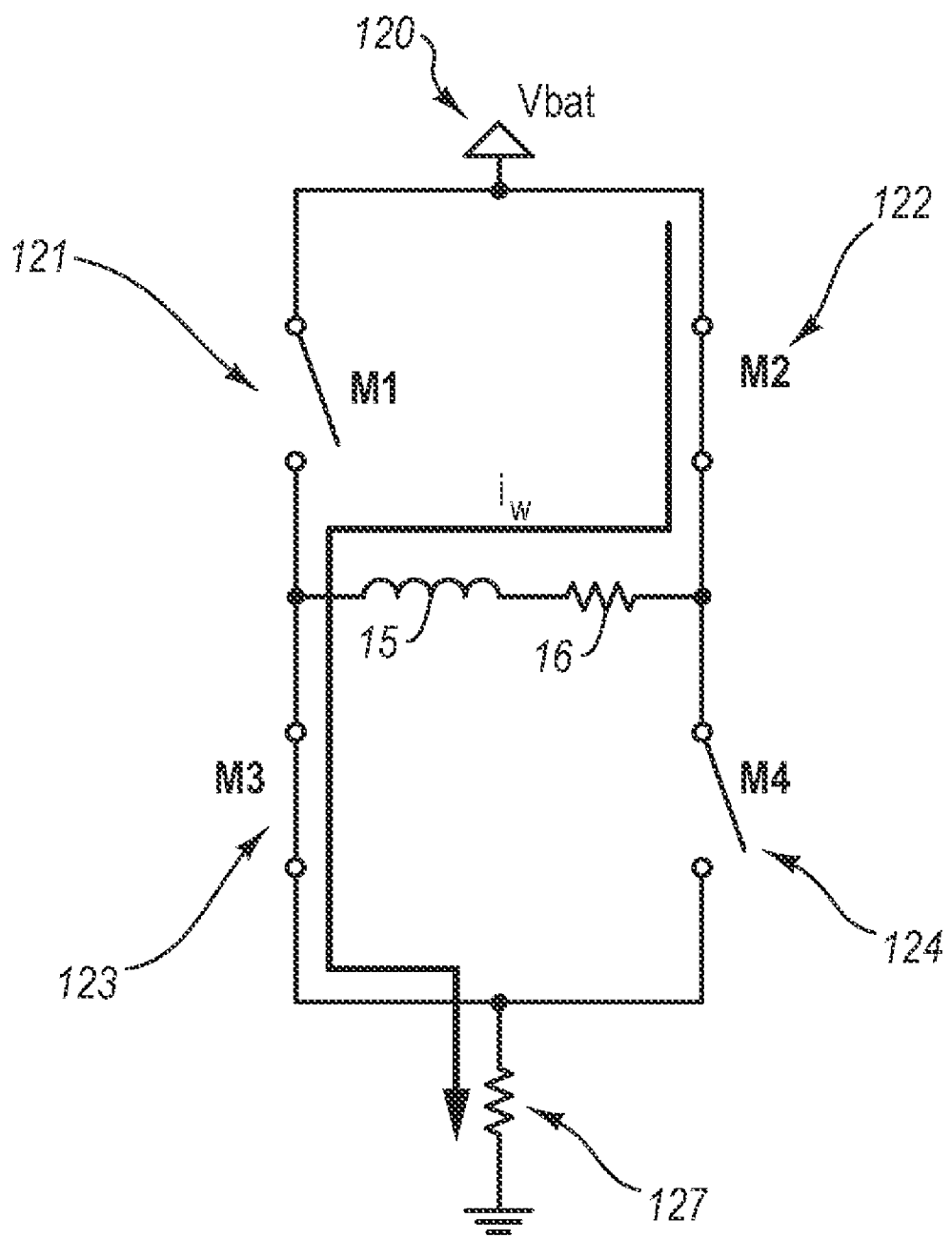
FIG. 14—Second configuration of the H-bridge.

In a first preferred embodiment, the direction of the current in the stator windings of a single phase brushless DC motor is controlled by means of a full H-bridge as seen on FIG. 12. The H-bridge comprises four switches that connect the stator windings (modeled as a coil 125 in series with a resistor 126) to a power supply Vbat (120). In particular these switches may be MOSFET transistor switches M1 (121), M2 (122), M3 (123) and M4 (124). The transistor switches are controlled by the signals TL (Top Left), TR (Top Right), BL (Bottom Left), BR (Bottom Right) respectively applied to the gate of M1, M2, M3 and M4. The transistor switches are either on or off depending on the signal applied at their gate (high H or low L). For instance, M1 and M4 might be closed and M2 and M3 open. In that case the current $i_w$ flows in the stator windings in a first direction (see FIG. 13). To inverse the sense of the current $i_w$, M1 and M4 may be opened and M2 and M3 closed (see FIG. 14). In the so called Slow Decay configuration, the current is let to decay to zero by e.g. opening both M1 and M2 and closing M3 and M4. In the so called Fast Decay configuration, the H-bridge is configured so as to force the current in an opposite direction (i.e. the amplitude of the current will reach zero faster than in the slow decay configuration and if applied long enough, the direction of the current will reverse and its amplitude increase), for instance, if current was flowing through the transistors M1 (121) and M4 (124) then to achieve Fast Decay of the current in the stator windings, transistors M1 (121) and M4 (124) are opened and transistors M2 (122) and M3 (123) are closed.

The amplitude of the current is measured by a sense resistor $R_{sense}$ (127) connected between a reference ground and the source of the transistor switches M3 (123) and M4 (124). A comparator (128) compares the voltage drop across the sense resistor (127) with a reference $i_{set}$ to determine whether or not the amplitude of the current $i_w$ in the stator windings is lower or larger than a given value $i_{set}$.

A regulator (129) uses the output of comparator (128) to generate control signals TL, TR, BL, BR in order to control the amplitude of the current $i_w$ and bring the amplitude of $i_w$ (as close as possible) to the given set value $i_{set}$. We will indiscriminately refer to control loop, feedback control loop or feedback loop to designate a circuit similar to that represented on FIG. 12. The feedback is ensured by measuring the current $i_w$, with the sense resistor (127), the measured current is then compared with a set-point value $i_{set}$ with a comparator (128) (in general, one evaluates the difference between the measured value and the set-point value), the result is used as input to a regulator (129) that determines one or more control signals (TL, TR, BL, BR) to be applied to an actuator (the H-bridge).

Pulse Width Modulation (PWM) can be used to control the amplitude of the current $i_w$ in the stator windings. In pulse width modulation, the supply voltage Vbat (120) is not applied continuously but only during a fraction of the time. As a result, everything happens as if the stator windings saw an average activation voltage that is a fraction of the supply voltage Vbat (120). In Pulse Width Modulation, instead of applying a continuous high signal e.g. TL to the gate of transistor M1 (121) and BR to the gate of transistor M4 (124) (while M2 (122) and M3 (123) are open, i.e. signals TR and BL are low), transistor e.g. M4 (124) is kept closed but transistor e.g. M1 (121) is switched on and off (see FIG. 15).

To control the amplitude of the current when it is flowing in the other direction, transistor M4 (124) is kept closed but transistor M1 (121) is alternatively switched on and off while M2 (122) and M3 (123) are open.

Figure 15:
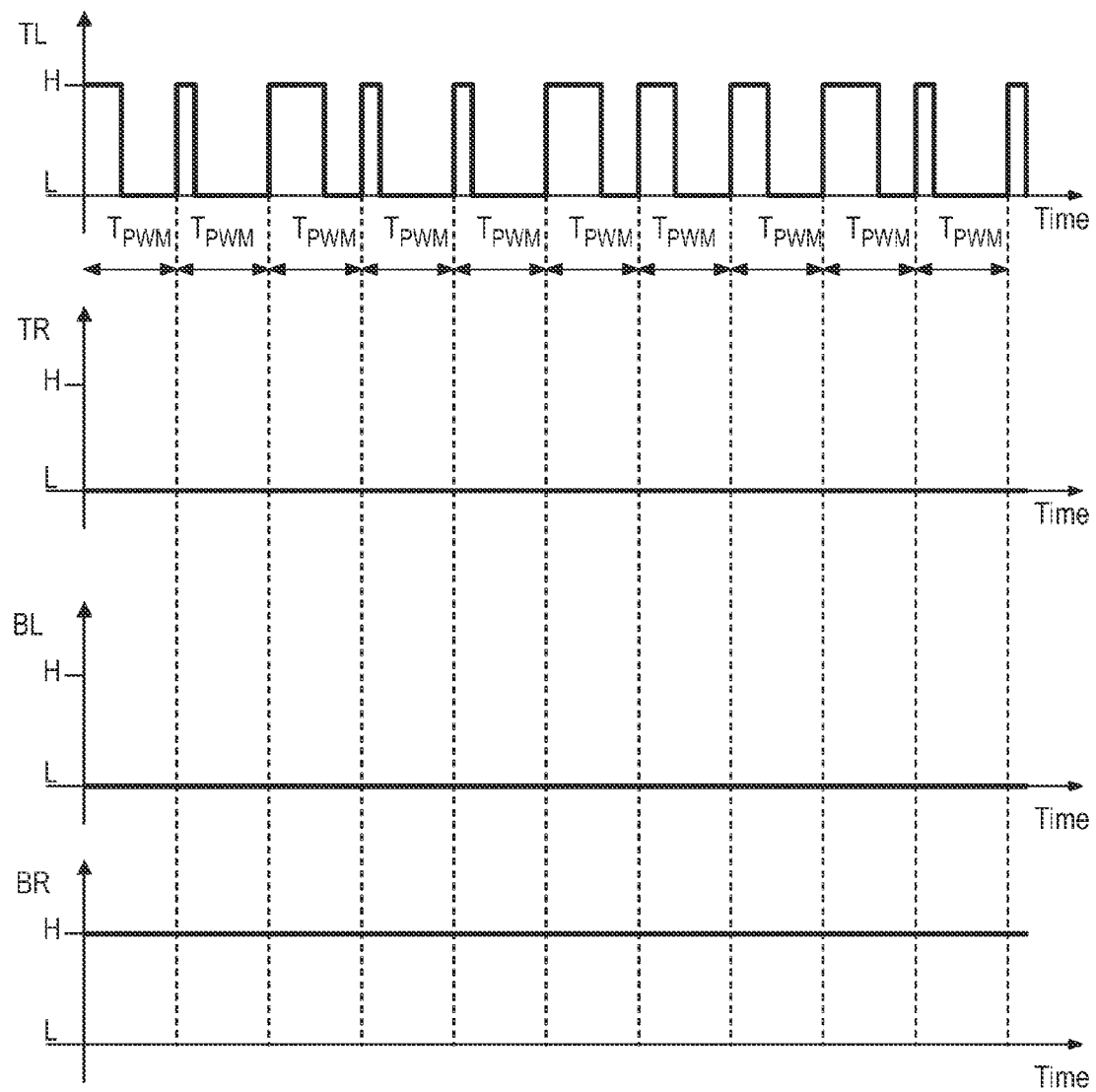
FIG. 15—Control signals to control the transistors of an H-bridge when PWM is used to control the amplitude of the current in the stator windings.
Figure 16:
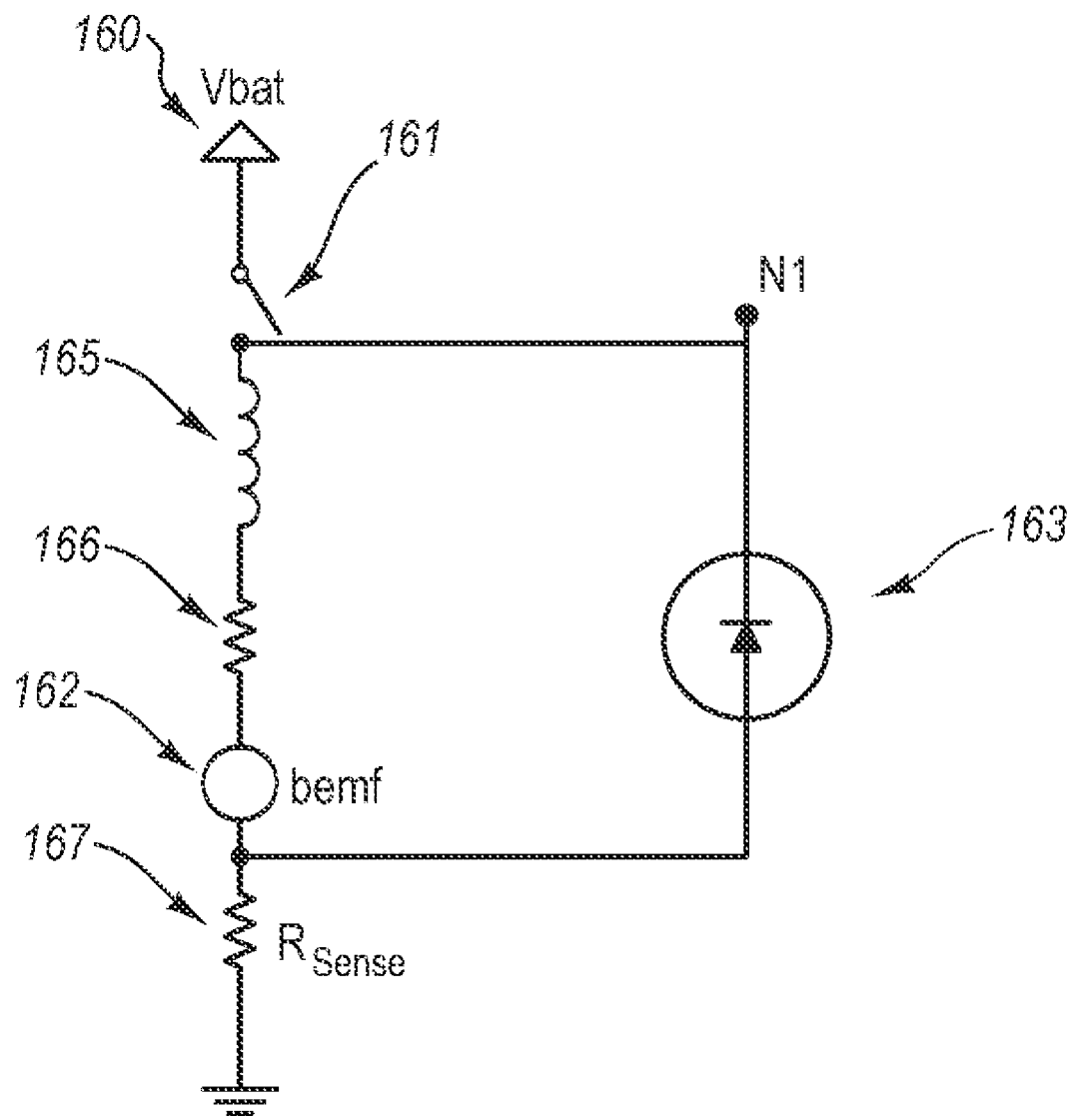
FIG. 16—Equivalent model of single phase brushless DC motor when PWM is used to control the amplitude of the current in the stator windings.

An equivalent circuit of the H-bridge and the motor when pulse width modulation is used to control the amplitude of the current in the stator windings is given on FIG. 16. The switch (161) is e.g. either transistor M1 (element 121 in FIG. 12) when the current must flow in a first direction or M2 (element 122 in FIG. 12) (see FIG. 12) when the current must flow in a second direction, the voltage source (162) represents the back electromotive force or bemf induced in the stator windings by the rotating permanent magnet at the rotor. The stator windings are modeled by the inductor (165) and the series resistor (166). A free wheeling diode (163) allows the current to circulate in the stator windings when the switch (161) is open. The freewheeling diode may be intentional or may be a parasitic diode of the transistor switches e.g. M3 or M4. For instance, when the switch 161 is the transistor M1 then the freewheeling diode 163 may be the parasitic diode associated with transistor M3. When the switch 161 is transistor M2 then the freewheeling diode 163 may be the parasitic diode associated with transistor M4. In particular, if the transistors M3 and M4 are n-type MOS transistors (in which case, the bulk electrode is often, if not always, shorted with the source electrode) and in that case the drain-bulk diode of M3 or M4 can in some cases be used as freewheeling diode. The voltage source 160 is connected in series with the switch 161, the inductor 165 and the resistor 166. Note that the free wheeling diode (163) is not strictly necessary. One could indeed proceed with the available transistors. The role of a free wheeling diode like the diode (163) is to allow the current to circulate through the coil (165) when the switch (161) is open. In an H-bridge, the role of the free-wheeling diode may be assumed by one of the transistors M1, M2, M3 or M4 at the cost of slightly increased complexity in how the H-bridge is operated in PWM mode. For instance, let us assume that as seen on FIG. 13 and FIG. 15 transistors M1 and M4 are closed in order to allow/force the current $i_w$ to flow in a given direction. In PWM mode, as will be explained in greater detail here below, transistor M1 is repeatedly open and closed while transistor M4 remains closed. When transistor M1 is open, no current can flow from Vbat (120) through the stator windings (125). With a freewheeling diode connected in parallel with the stator windings (i.e. elements 15, 16), the current keeps flowing through the stator windings and through the freewheeling diode when transistor M1 is open. In absence of freewheeling diode, one can close the transistor switch M3 when transistor switch M1 is opened so that the current $i_w$ will flow through the loop 126, 125-M4-sense resistor 17-GND-M4-16. To avoid a short circuit from Vbat to GND, one has to delay closing of transistor M3 until transistor M1 is fully (or at least, sufficiently) opened and one has to open transistor M3 before closing transistor M1.

In pulse width modulation, the control signal (TL when transistor M1 (121) is used or TR when transistor M2 (122) is used) that opens or closes the switch 161 is as seen on FIG. 15 (see evolution of TL in function of the time) or 17 (see evolution of PWM Signal in function of time). One sees that the control signal varies between a low level (L) and a high level (H). The low and high levels are such that they can either close or open the switch to which they are applied. Time is divided into intervals of equal length $T_{PWM}$. The PWM frequency $f_{PWM}$ is defined as the inverse of the interval $T_{PWM}$ i.e. $f_{PWM}=1/T_{PWM}$. The PWM signal also referred to as the control signal (e.g. TL or TR) in this first preferred embodiment is held high for a fraction of every time interval $T_{PWM}$. That fraction may vary from one interval to the other.

The current $i_w$ in the stator windings will vary with time according to the equations:

$$V\text{bat}=-L_w di_w/dt+R_w i_w+V(\text{BEMF})+R_{sense}i_w \quad (\text{Eq. 1})$$

when the switch 161 is closed and;

$$0=-L_w di_w/dt+R_w i_w+V(\text{BEMF})+R_{sense}i_w \quad (\text{Eq. 2})$$

when the switch 161 is open.

According to Eq. 1, all other things being kept equal, the longer the switch 161 is held closed, the larger the increase in amplitude of the current $i_w$. Similarly, according to Eq. 2 and all other things being kept equal, the longer switch 161 is held open, the more important the decrease in amplitude of the current $i_w$. In pulse width modulation the switch 161 will be closed or open in function of the output of comparator (128).

Figure 17:
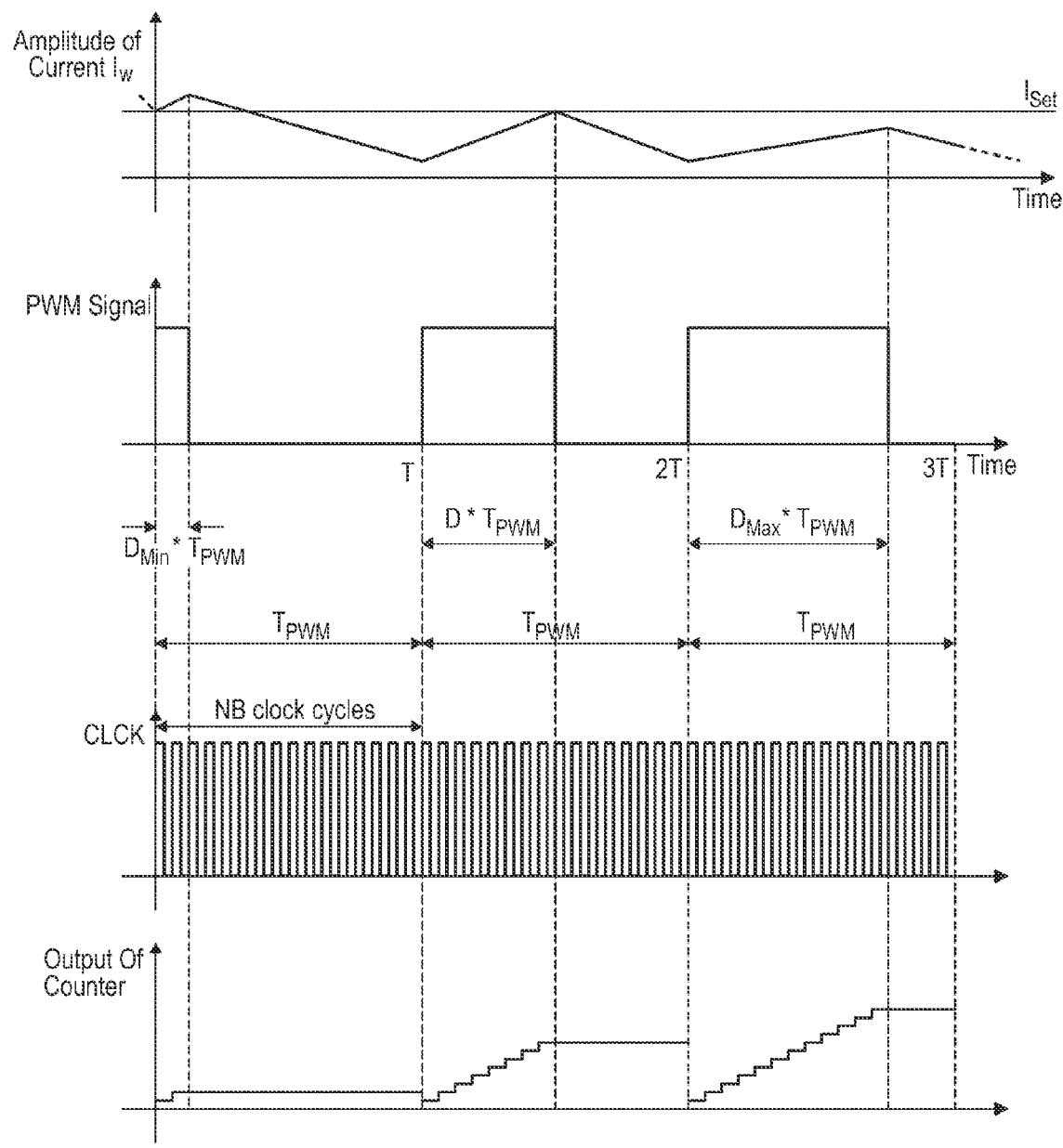
FIG. 17—Variation in function of time of the current in the stator windings, the duty cycle of the PWM signal and the output of counter.

The control signals are generated by the regulator 129 (and in particular, as considered in this first embodiment, a PWM regulator) and must satisfy, certain conditions. For instance, to avoid audible frequencies, the PWM frequency $f_{PWM}$ is chosen higher than the audible range. The duty cycle DC will be defined as the fraction of the period $T_{PWM}$ during which the (full) supply voltage Vbat is applied to the stator windings. To avoid generation of sub-harmonics of the PWM signal in the audible range, duty cycles of 0 and 100% are excluded. In particular, duty cycle of 0% and 100% may be avoided as follows (see FIG. 17). The PWM signal is high at the beginning of a PWM period (for at least $D_{Min}*T_{PWM}$) and is held high as long as the current in the coil has not reached a reference value $i_{set}$ as indicated by the output of comparator 128. Regardless of the current in the stator $i_w$, after a time $D_{max}*T_{PWM}$ (* is the operator for multiplication) the output of the PWM is always set to 0 for the portion of the PWM period between $D_{Max}T_{PWM}$ and the end of that PWM period. A typical value for $D_{Max}$ might be 0.75. A typical value for $D_{Min}$ might be 0.05. The PWM signal may be applied to either the gate of transistor M1 (121) or transistor M2 (122) depending on the required direction of the current.

The higher the required current in the stator windings, the higher the average activation voltage seen by the stator windings must be and the higher the duty cycle must be. To keep the amplitude of the current in the stator windings constant when the amplitude of the BEMF signal increases (all other things being kept equal), the duty cycle must increase accordingly, indeed, the bemf signal acts against the supply voltage. To keep the current in the stator windings constant when the amplitude of the BEMF signal decreases (all other things being kept equal), the duty cycle must decrease accordingly. Hence, the variation of the duty cycle DC "mirrors" the variation of the amplitude of the BEMF signal. Therefore, in a circuit like the one of FIG. 12, information on the BEMF signal can be extracted from the duty cycle of the PWM signal.

Figure 18:
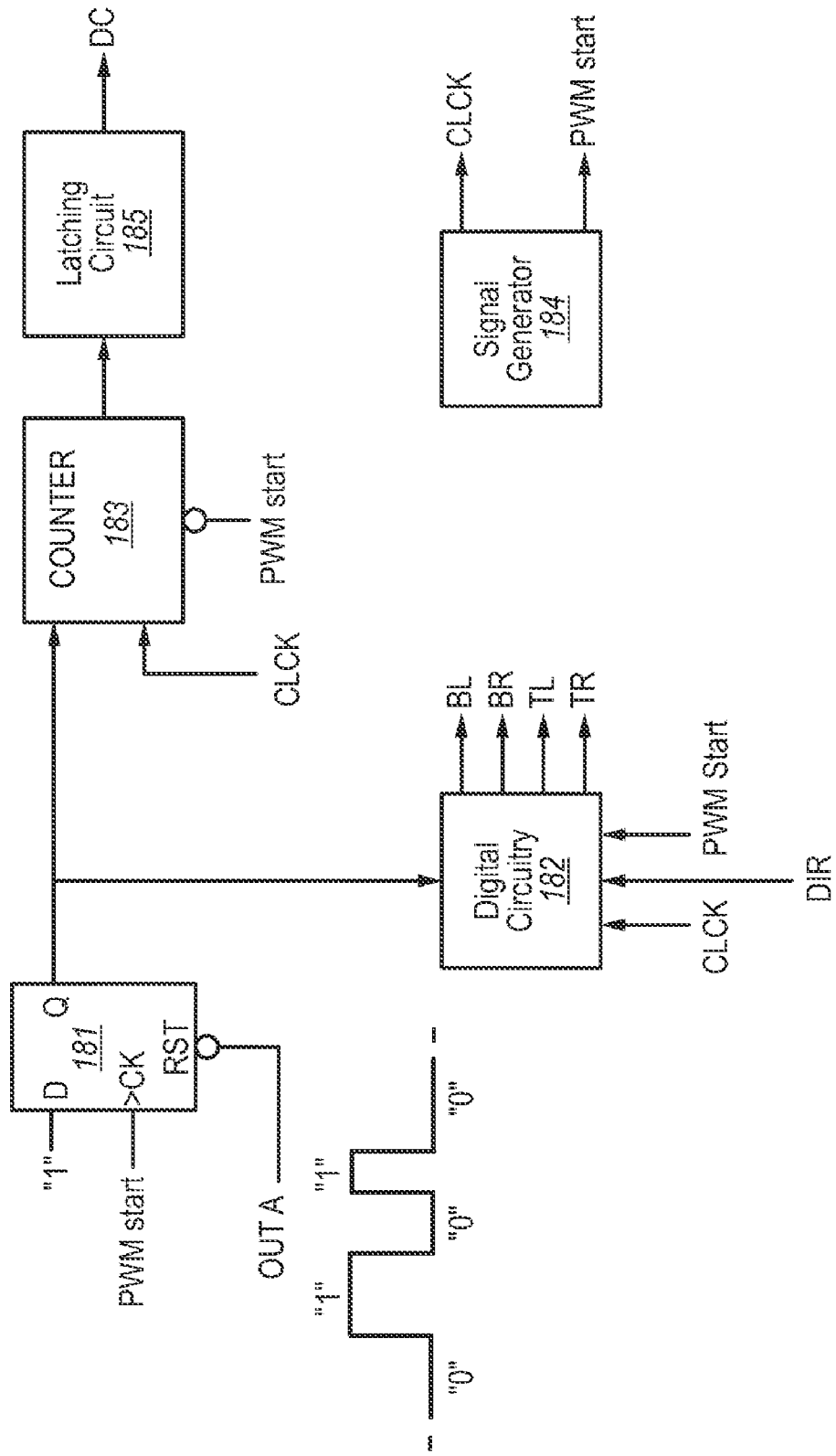
FIG. 18—Example of regulator.

A particular implementation of the regulator 129 can be seen on FIG. 18. The output OUTA of the comparator 128 is used as reset signal for a D type flip flop 181 (i.e. the output Q of the flip flop is reset to the logical state '0' when the signal OUTA corresponds to a logical '0' corresponding to $i_{set}<i_w$). A pulse signal "PWM start", generated by an ad-hoc signal generator, determines the start of a PWM period and shifts a logical '1' signal from the D input to the Q output of flip-flop 181. The same "PWM start" signal reset a counter 183 (i.e. it sets the output of the counter 183 to a preset value). For the sake of clarity and unless stated otherwise we will assume that the counter is reset to 0 at the beginning of each PWM period. The counter 183 may for instance be a binary counter whose output consists of $N_{counter}$ bits that are made available either serially or in parallel. The output of the counter varies between 0 and $2^{Ncounter}-1$. When at logical '1', the signal on the Q output enables the counter 183 that counts the clock signal CLCK generated by the signal generator 184 at a frequency $f_{CLCK}$ higher than the frequency $f_{PWM}$ of the PWM. The clock frequency is typically chosen so that the PWM period $T_{PWM}$ is (substantially) equal to an integer number NB of the clock signal period $T_{CLCK}=1/f_{CLCK}$, i.e. $T_{PWM}=NB*T_{CLCK}$. The PWM period $T_{PWM}$ is e.g. 128 CLCK period long. The counter 183 is incremented by the clock signal CLCK as long as Q is high. Q which is the PWM signal, is held high as long as the output OUTA of the comparator 128 is at logical '1' i.e. as long as the current $i_w$ in the stator windings is lower than the reference $i_{set}$. Based on the above, at the end of a PWM period, the output of the counter equals the number of CLCK periods counted by the counter 183 and during which the PWM signal was high during that PWM period, i.e. the output of the counter at the end of a PWM period is proportional to the duty cycle (+/−½ LSB i.e. NB*DC where LSB stands for Least Significant Bit and corresponds to the smallest possible increment for the output of the counter). As said earlier, if one wants to avoid a duty cycle of 0% and 100%, one might for instance keep the PWM signal high for at least 1 clock period and at most $D_{MAX}$*NB clock period. This is easily implemented in logic circuitry by combination of logic signals in a number of ways known from the art. The circuit on FIG. 18 may also contain a latching circuit 185 that will latch the content of the counter once the output Q of the flip-flop 181 returns to 0 and that the counter will not increment anymore.

Digital circuitry, block 182 on FIG. 18, determines the signals BL, BR, TL and TR based on the signals Q, CLCK, PWM Start and the required direction of $i_{set}$ (signal Dir). For example, if a first direction of the current is required, the block 182 will direct Q to the control electrode TR of transistor M2 (122), set BL to high (to close transistor M3) and set BR and TL to low (to open transistors M1 and M4). In absence of freewheeling diode, the block 182 will set the signal BR high or low in function of the state of signal TR (see above) to allow the current to circulate trough the stator windings while avoiding a short circuit from Vbat to GND.

If a second direction of the current is required, the block 182 will direct Q to the control electrode TL of transistor M1 (121), set BR to high (to close transistor M4) and set BL and TR to low (to open transistors M2 and M3). In absence of freewheeling diode, the block 182 will set the signal BL high or low in function of the state of signal TL (see above) to allow the current to circulate through the stator windings while avoiding a short circuit from Vbat to GND.

Figure 19:
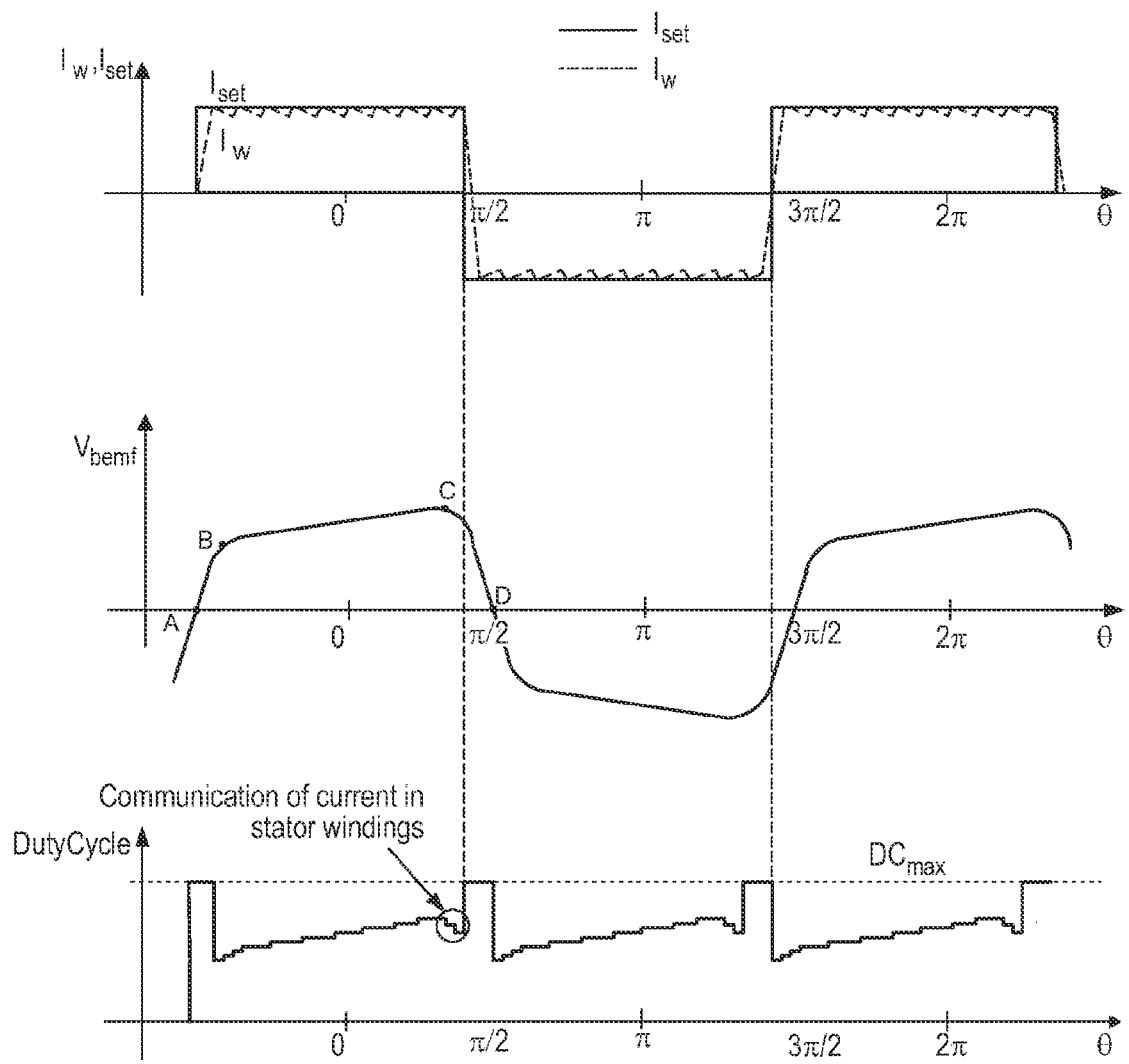
FIG. 19—Evolution of the current in the windings, the BEMF signal and the duty cycle in function of the angular position of the rotor.

An example of variation of the duty cycle DC and of the BEMF signal in function of the position of the rotor is seen on FIG. 19. In FIG. 19, we have taken a trapezoidal signal with a non flat top ABCD to model the BEMF without limitation of scope. As discussed earlier, for a given $i_{set}$ and all other things being kept equal, when the amplitude of the BEMF signal increases the duty cycle DC of the PWM signal controlling the current in the motor increases as well and when the amplitude of the BEMF signal decreases, the duty cycle DC of the PWM signal controlling the current in the motor decreases as well. The duty cycle DC reaches a maximum as the amplitude of the BEMF signal reaches a maximum. Based on the known behavior of the BEMF signal, a (steep) decrease of the amplitude of the BEMF signal and hence a (steep) decrease of the duty cycle DC, indicates that the position of the rotor is close to a commutation point (the BEMF signal is about to crosses zero). Therefore, the decision to reverse the direction of the current is to be taken e.g. when the duty cycle reaches a maximum (point C on FIG. 19) or shortly after the duty cycle has reached a maximum. On FIG. 19 a first possible direction for the current corresponds to that part of the graph representing Iw in function of θ above the θ-axis, i.e. it corresponds to positive value of the current, and a second possible direction for the current corresponds to that part of the graph below the θ-axis, i.e. it corresponds to negative value of the current. When the set point is represented by a negative value on FIG. 19 ($i_{set}$<0), it must be understood that the sign of the reference signal $i_{set}$ applied to an input of comparator 128 is not changed but the direction of the current in the stator windings is the second one, the amplitude of the current is still monitored with the sense resistor 127 which can be used to measure the amplitude of the current regardless of its direction and the switches M1 to M4 of the H-bridge are configured (i.e. opened or closed) to force the current to flow in the chosen direction. After the switches of the H-bridge have been reconfigured to invert the direction of the current in the stator windings and because of the self inductance of the stator coil, the direction of the current $i_w$ will not change sign instantaneously, the amplitude of $i_w$ will first decrease until it reaches zero, the sign of $i_w$ will change (zero crossing) and its amplitude will grow again. During the transition from $i_w=i_{set}$ to $i_w=−i_{set}$, the amplitude of $i_w$ will be smaller than $i_{set}$ ($|i_w|<i_{set}$) and the PWM regulator 129 will react by increasing the duty cycle DC. Depending on the set point $i_{set}$, the characteristics of the motor and its speed of rotation, the duty cycle may be forced to its maximum value $D_{max}$ during most of the transition or during the entire transition from $i_w=i_{set}$ to $i_w=−i_{set}$ as represented on FIG. 19.

Figure 20:
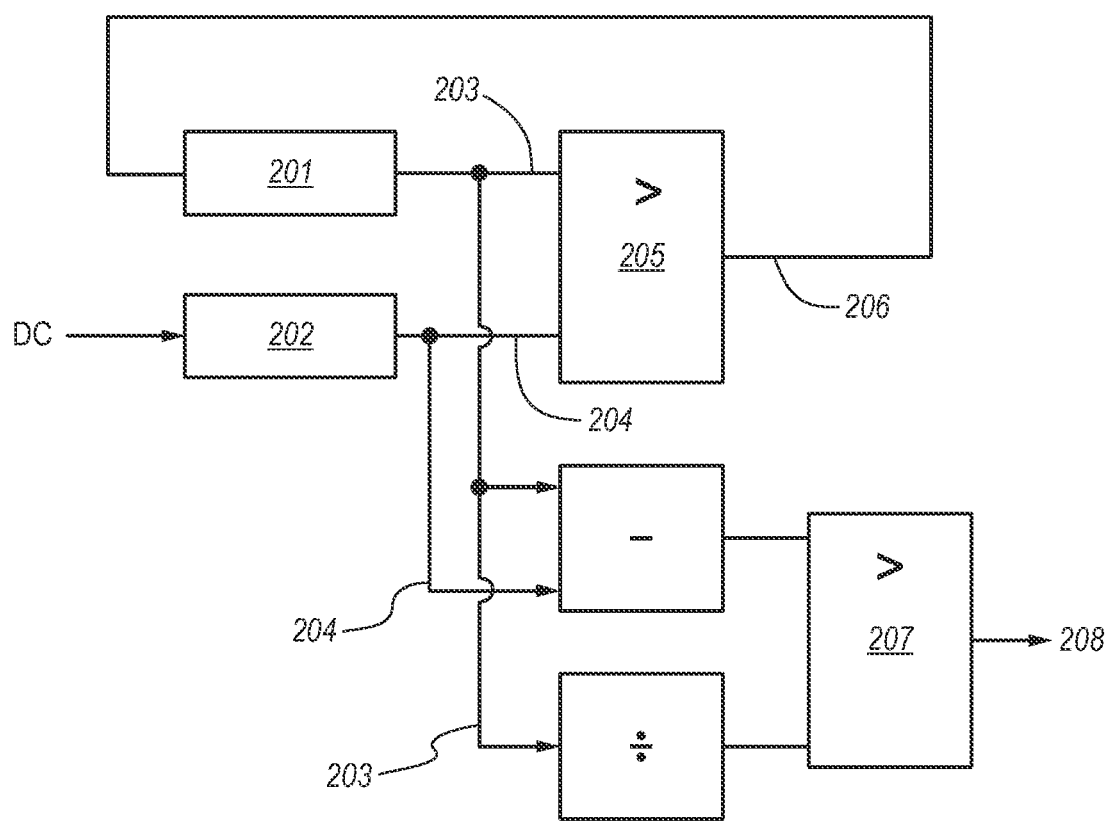
FIG. 20—Example of filter to determine the commutation instant based on the duty cycle.

FIG. 20 gives a principle schematics of logic circuitry 200 that can be used to determine the commutation instants (whether the BEMF signal is symmetric or not, whether the BEMF signal can be modeled has a trapezoid with a flat top or a non flat top). A register 201 stores the highest value HDC of the duty cycle DC measured between an instant $t_0$ and an instant t (with $t_0$<t). A comparator 205 compares the content 203 of the register 201 with the current DC 204 measured by the DC counter (and latch) 202, if the current DC 204 is higher than the content 203 of the register 201, the content of the register 201 is updated with the current DC 204.

To decide when to change the direction of the current $i_w$ in the stator, the difference between the current DC 204 and the content 203 of the register 201 is constantly evaluated and compared by a comparator 207 to a fraction of the content 203 of the register 201. Once the difference between the current DC 204 and the content 203 of the register 201 is higher than a given percentage of the maximum value of the DC reached within the interval [$t_0$, t] the direction of the stator current is changed or in other words, if (HDC−current DC)>HDC/N, then the direction of the stator current is changed. The signal 208 indicating that the direction of the current must be changed is available at the output of the comparator 207. To accommodate binary representation and simplify the implementation of the division, N will preferably be an integer number multiple of 2. This does not exclude other type of values for N in a general case. N can be considered as a sensitivity factor that determine how big variations of the duty cycle need to be to trigger commutation of the current in the stator windings. By varying the value of N, one can modify the instant at which commutation of the current in the stator windings is done and optimize the commutation of the current in function of the specificities of the motor.

The content HDC of the register 201 is (re)-initialized to e.g. 0 at the instant the direction of the current in the stator winding is changed. As can be seen on FIG. 19, when the H-bridge is reconfigured to force the current in the stator windings to change direction (i.e. at a commutation instant), the control loop will often overshoot and the duty cycle will reach its maximum value. To prevent the overshoot from being interpreted as a maximum of the BEMF signal that anticipates a commutation instant, some filtering is required. For instance, (1) variation of the duty cycle between two consecutive PWM periods that exceeds the maximum variation that can be expected from a given BEMF profile (steepness of slope, maximum amplitude) may be ignored (i.e. the content HDC of the register 201 is not updated) or used to reset the register 201 to e.g. 0 (on FIG. 19, register 201 would be reset by the sudden decrease of the duty cycle that occurs around point D) or (2) the content HDC of the register 201 is reset as long as no minimum in the DC cycle has been reached. Indeed, as can be seen on FIG. 19, the duty cycle will decrease from its overshoot values before increasing to maintain the amplitude of the current in the stator winding constant as the amplitude of the BEMF increases. These filtering criteria may be implemented in a number of ways known to the art with a slate machine, a microcontroller, a microprocessor, etc.

The duty cycle as measured between the instant t0 at which the register 201 has been last reset and the instant $t_1$ at which the direction of the current is changed (as determined by the output of a circuit like e.g. that of FIG. 20) may be used in various ways to determine cinematic quantities (e.g. angular displacement, angular speed, angular acceleration) and, when the BEMF signal is not symmetrical, the direction of rotation of the motor.

Figure 21:
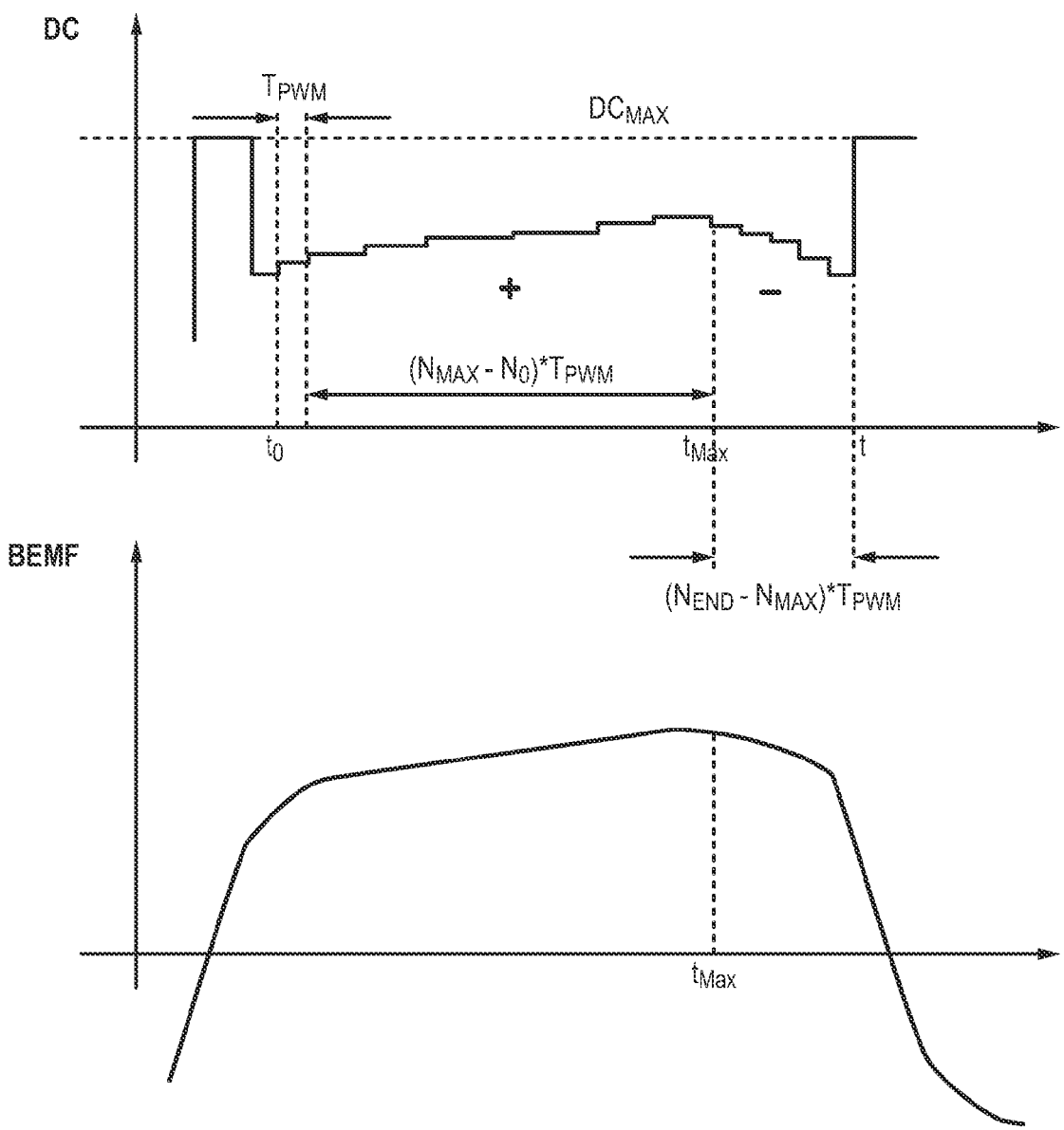
FIG. 21—Evolution of the duty cycle and the BEMF signal when the rotor turns in a first direction.
Figure 22:
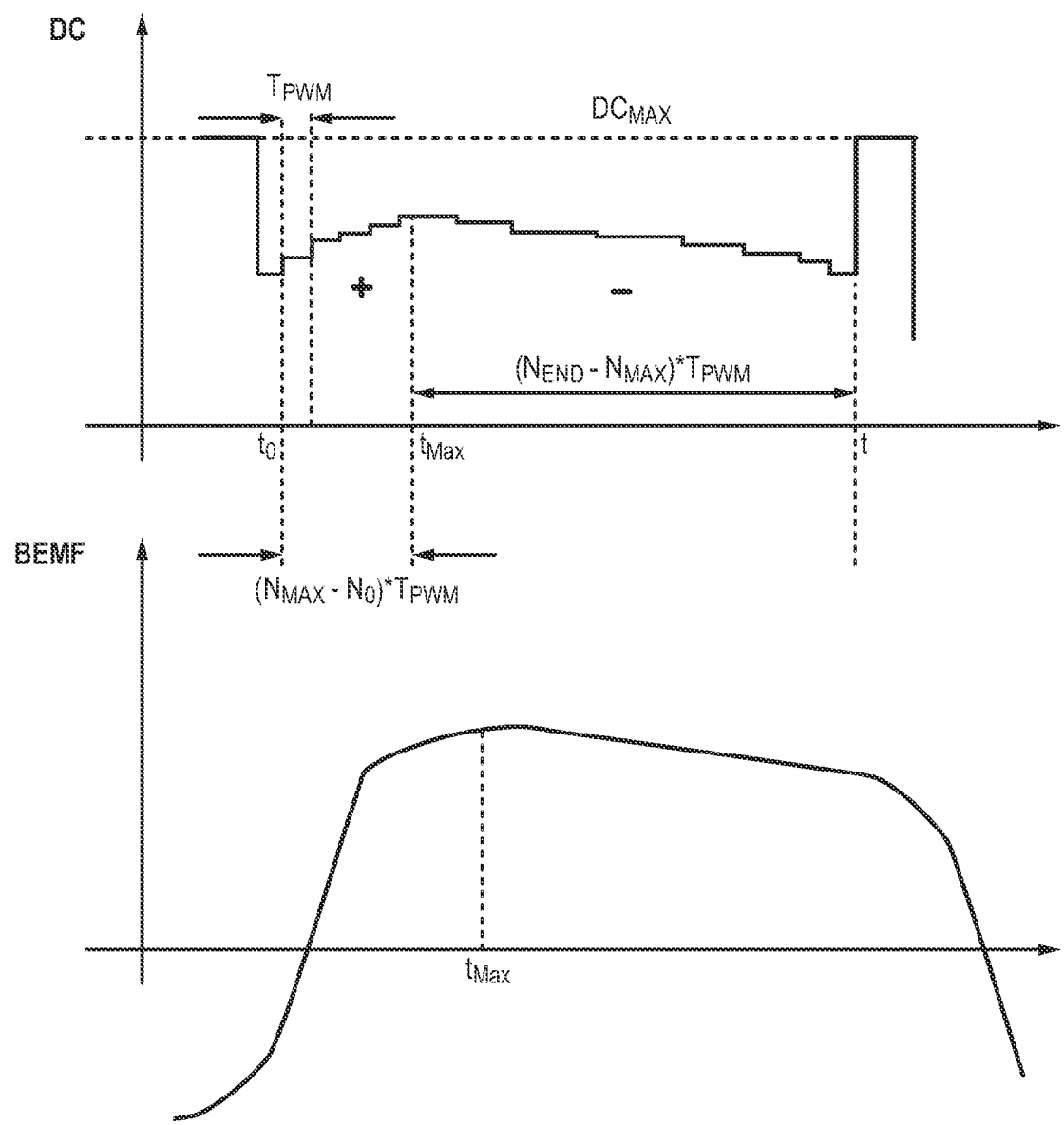
FIG. 22—Evolution of the duty cycle and the BEMF signal when the rotor turns in a second direction.

First consider a first method to determine the direction of rotation of the motor based on an analysis of the signals represented on FIGS. 21 and 22. The duty cycle DC is fed to a first filter 231 that performs filtering as described in the above. Starting from t0 (determined by e.g. the last reset signal, a counter 232 is incremented by one at each PWM period as long as the duty cycle DC has not reached its maximum. Once the duty cycle DC has reached its maximum at a time $t_{max}$ (with $t_0 < t_{max} < t$), the counter 232 is decremented by one at each PWM period. The instant t may be determined as explained above e.g. based on the output of the circuit of FIG. 20. At the instant t the content of the counter is latched and if the latched content of counter 232 is positive, it means that the duty cycle DC has increased during a higher number of PWM period than the number of PWM period within which the duty cycle DC decreased. This is interpreted as the rotor moving in a first direction corresponding to the BEMF signal as seen on FIG. 21. If on the contrary, the content of the counter 232 is found to be negative it means that the duty cycle DC has increased during a lower number of PWM period than the number of PWM period within which the duty cycle DC decreased. This is interpreted as the rotor moving in a second direction corresponding to the BEMF signal as seen on FIG. 22.

Figure 23:
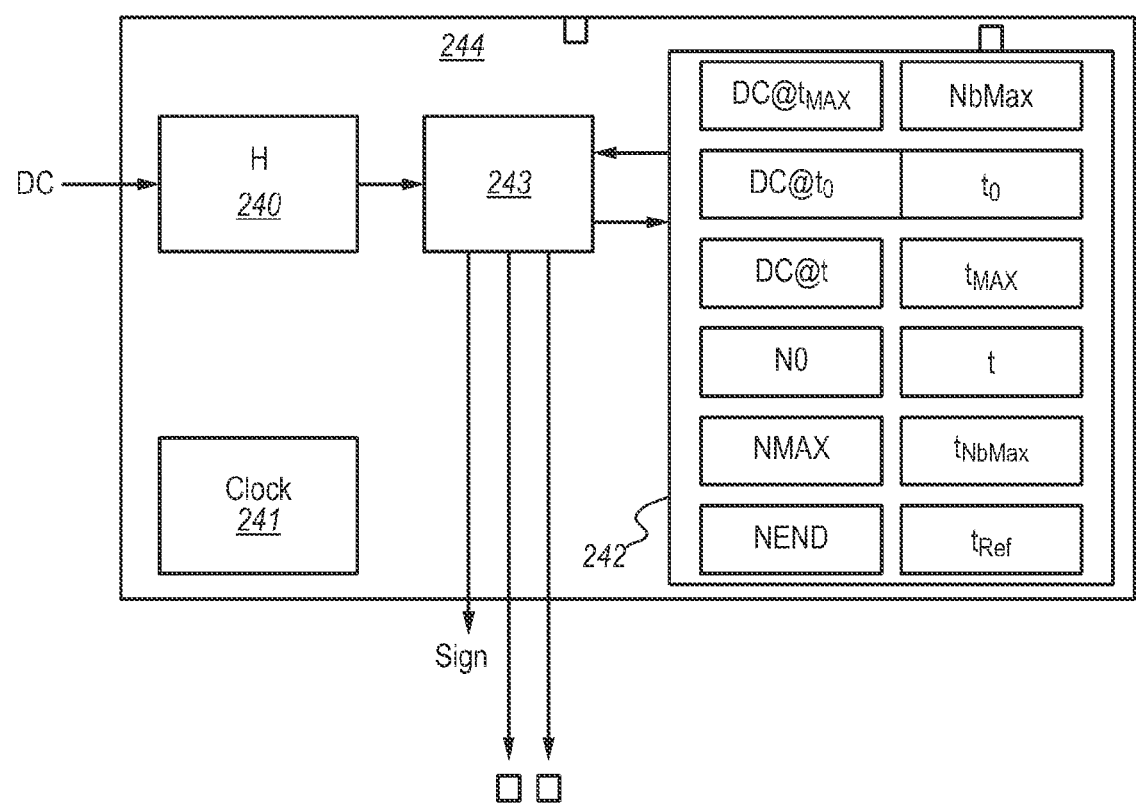
FIG. 23—Example of circuit to determine cinematic quantities based on the duty cycle.

Now consider a second method to determine the direction of rotation of the motor based on an analysis of the signals represented on FIGS. 21 and 22 with a circuit implementing the block diagram of FIG. 23.

The duty cycle DC is first filtered by a filter 240 according to filtering criteria discussed earlier. The filter can for instance be synthesized with VHDL as known in the art based on the principle diagram on FIG. 20. A clock 241 allows to measure time/time intervals. The filter 240 determines when to start taking measured duty cycle DC into account when looking for a maximum. The filter 240 determines the maximum duty cycle between the instant $t_0$ and t. Be DC@$t_{Max}$, DC@$t_0$ and DC@t the maximum duty cycle, the duty cycle at the instant t0 and the duty cycle at the instant t as determined by the filter 240. Those three values are stored in registers 242 together with the corresponding time t0, $t_{Max}$ and t as measured by the clock 241.

Be AARI1 the absolute value of a first average rate of increase of the duty cycle DC is computed between the instant t0 and the instant $t_{Max}$. AARI1 may be approximated by an arithmetic unit 243 according to Eq. 3 here below:

$$\text{AARI1} = |(DC@t_{Max} - DC@t_0)/(t_{Max} - t_0)| \quad \text{Eq. 3}$$

Be AARI1 the absolute value of a second average rate of increase of the duty cycle DC is computed between the instant t0 and the instant $t_{Max}$. AARI2 may be approximated by arithmetic unit 243 according to Eq. 4 here below:

$$\text{AARI2} = |(DC@t_{Max} - DC@t)/(t_{Max} - t)| \quad \text{Eq. 4}$$

To simplify computations of both AARI1 and AARI2, the denominator of both equation 3 and equation 4 may be replaced by (NMAX−N0) and (NMAX−NEND) where N0, NMAX and NEND are the number of PWM periods that have elapsed at time $t_0$, $t_{Max}$ and t respectively. Typically, N0 will be equal to 0. NMAX and NEND may easily be obtained by counting the number of PWM start signal generated by the signal generator 184 of FIG. 18 between t0 and $t_{Max}$, t0 and t respectively. The number of PWM periods may for instance be obtained by counting the signal PWM start in a number of ways known to the art. The filter and the clock may be part of a general purpose calculator 244μ (a microcontroller, a microprocessor, a microcomputer, etc) as seen on FIG. 23.

If AARI1<AAIR2, this is interpreted as the rotor moving in a first direction corresponding to the BEMF signal as seen on FIG. 21.

If AARI1>AAIR2, this is interpreted as the rotor moving in a second direction corresponding to the BEMF signal as seen on FIG. 22.

Note that the quantities AARI1 and AARI2 may be computed directly from the BEMF signal as it would be measured or evaluated by a dedicated sensor e.g. the voltage drop across a coil sensor, said coil sensor may be the windings of a phase of a bipolar stepper motor when that phase is used as sensor to determine the position of the rotor of the stepper motor. The method proposed to determine the direction of rotation of a motor when the BEMF signal is not symmetrical is hence not limited to a single phase stepper motor operated in PWM mode.

Figure 1:
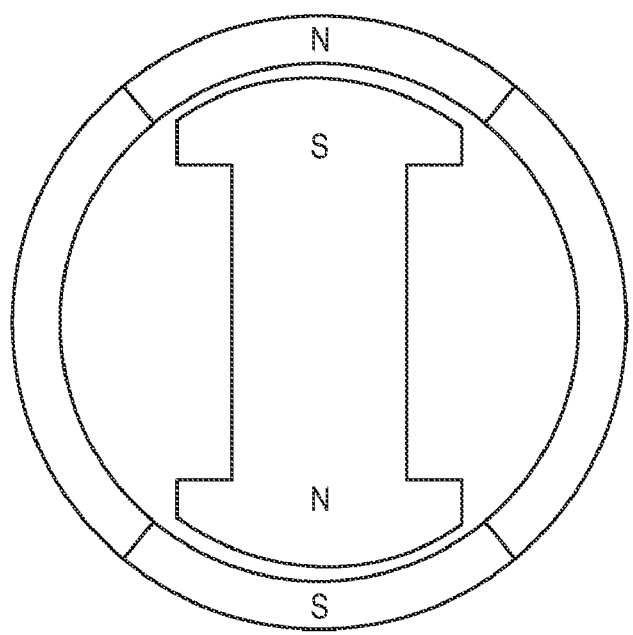
FIG. 1—Example of eccentricity in the stator and rotor elements of a single phase brushless DC motor.
Figure 2:
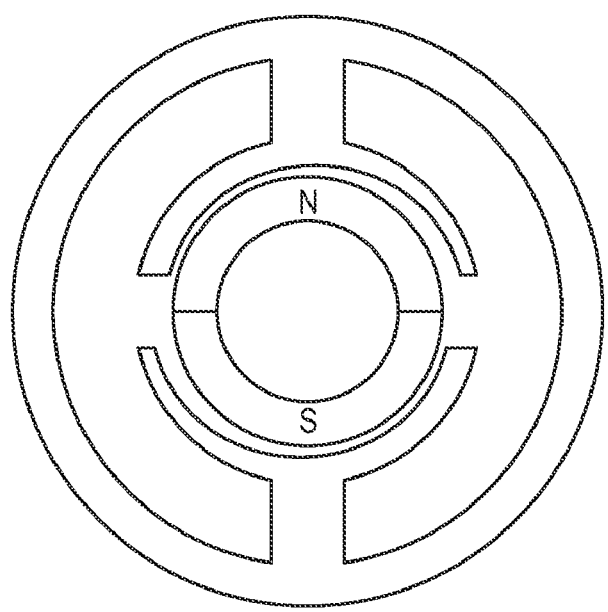
FIG. 2—Example of asymmetry in the stator and rotor elements of a single phase brushless DC motor.
Figure 3:
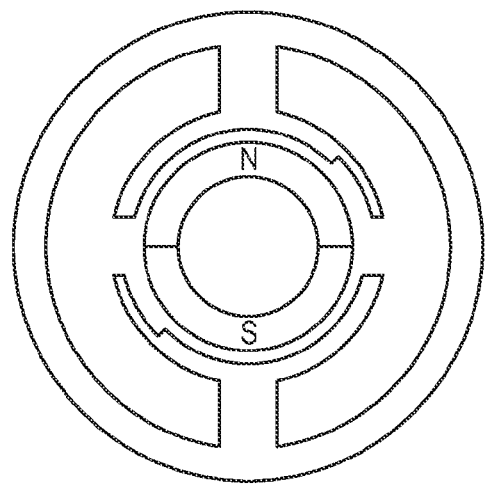
FIG. 3—Example of asymmetry in the stator and rotor elements of a single phase brushless DC motor.
Figure 4:
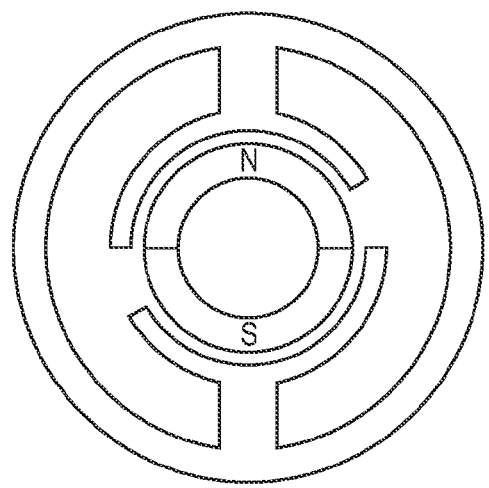
FIG. 4—Example of asymmetry in the stator and rotor elements of a single phase brushless DC motor.
Figure 5:
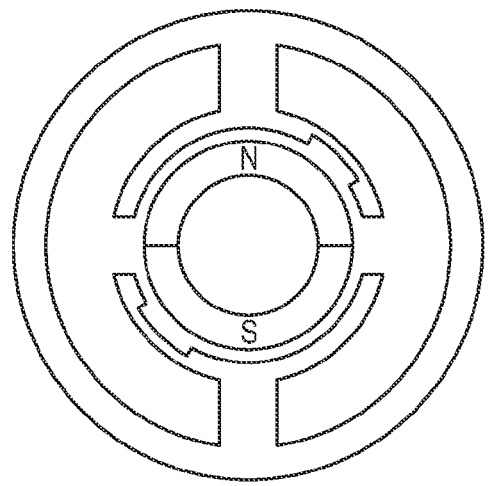
FIG. 5—Example of asymmetry in the stator and rotor elements of a single phase brushless DC motor.
Figure 6:
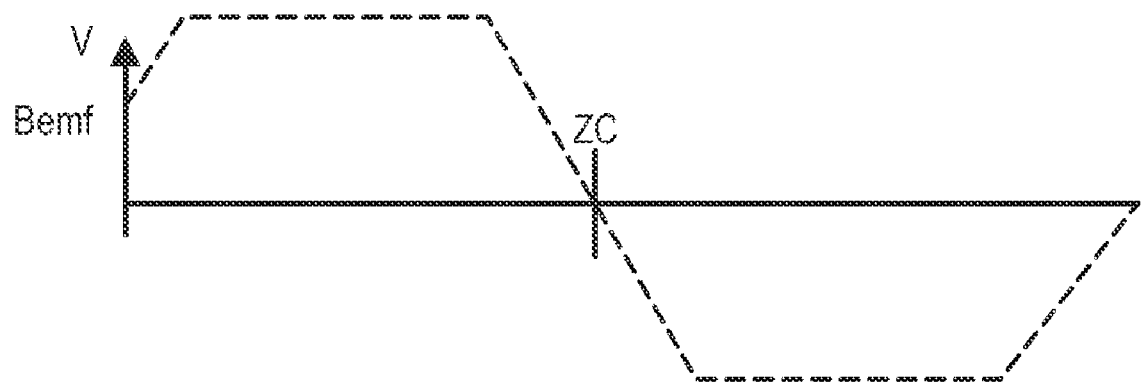
FIG. 6—Variation in function of time of the BEMF voltage in the stator windings of a permanent magnet DC motor—trapezoidal profile with flat top.
Figure 7:
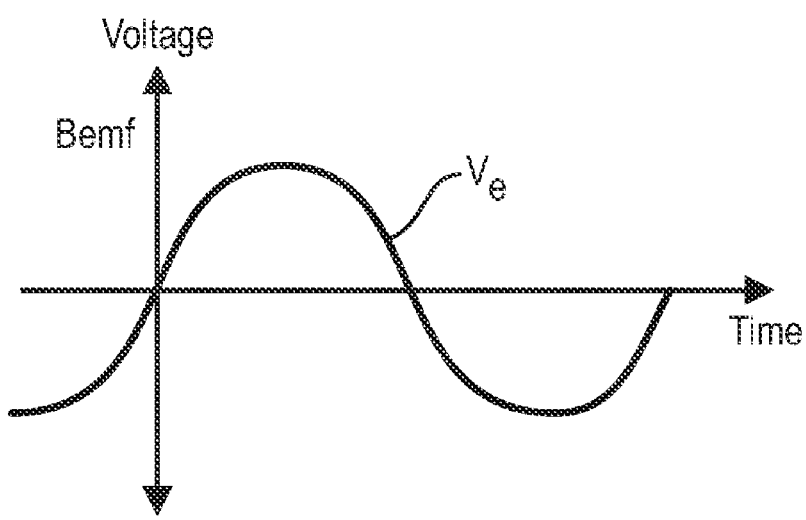
FIG. 7—Variation in function of time of the BEMF voltage in the stator windings of a permanent magnet DC motor—sinusoidal profile.
Figure 8:
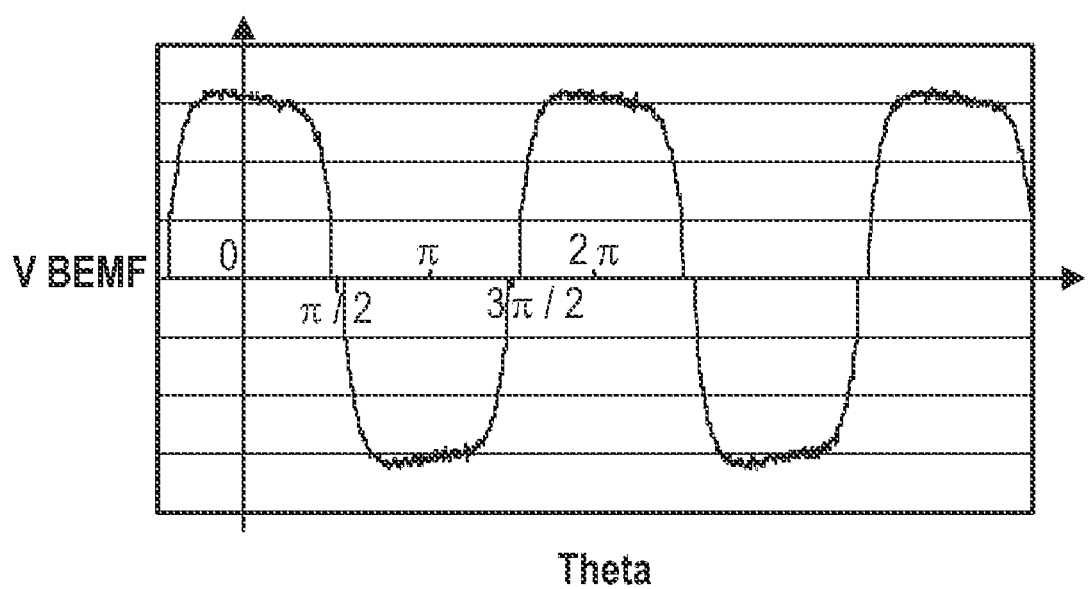
FIG. 8—Back electromotive force induced in the stator windings of a single phase brushless DC motor with tapered air gap rotating in a first direction.
Figure 9:
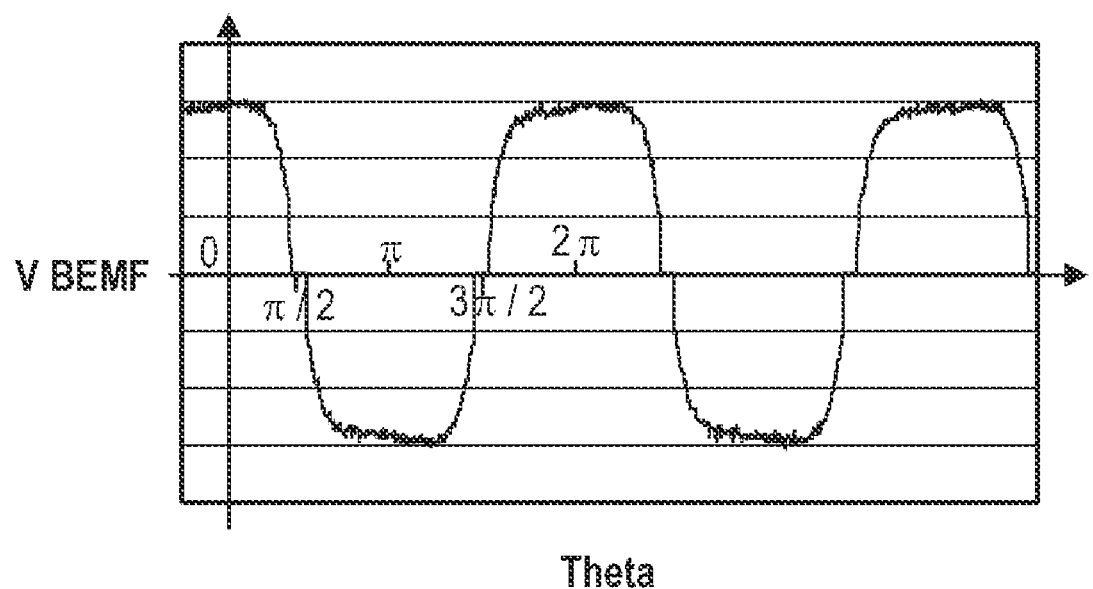
FIG. 9—Back electromotive force induced in the stator windings of a single phase brushless DC motor with tapered air gap rotating in a direction opposite to the first.
Figure 10A:
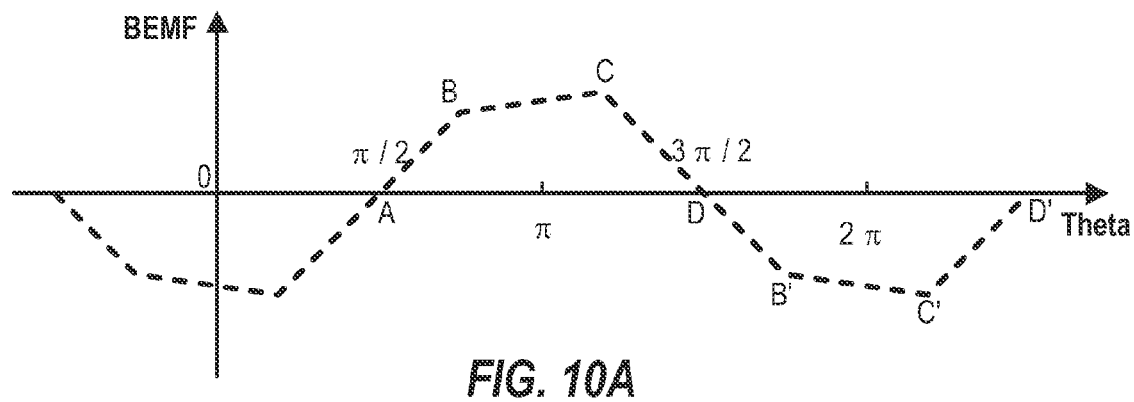
FIG. 10A—Idealized back electromotive force induced in the stator windings of a single phase brushless DC motor with tapered air gap rotating in a first direction.
Figure 10B:
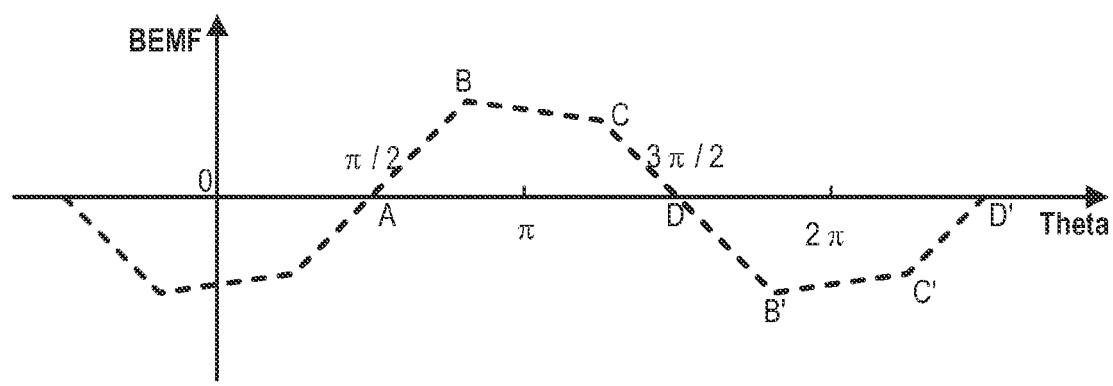
FIG. 10B—Idealized back electromotive force induced in the stator windings of a single phase brushless DC motor with tapered air gap rotating in a direction opposite to the first.
Figure 11:
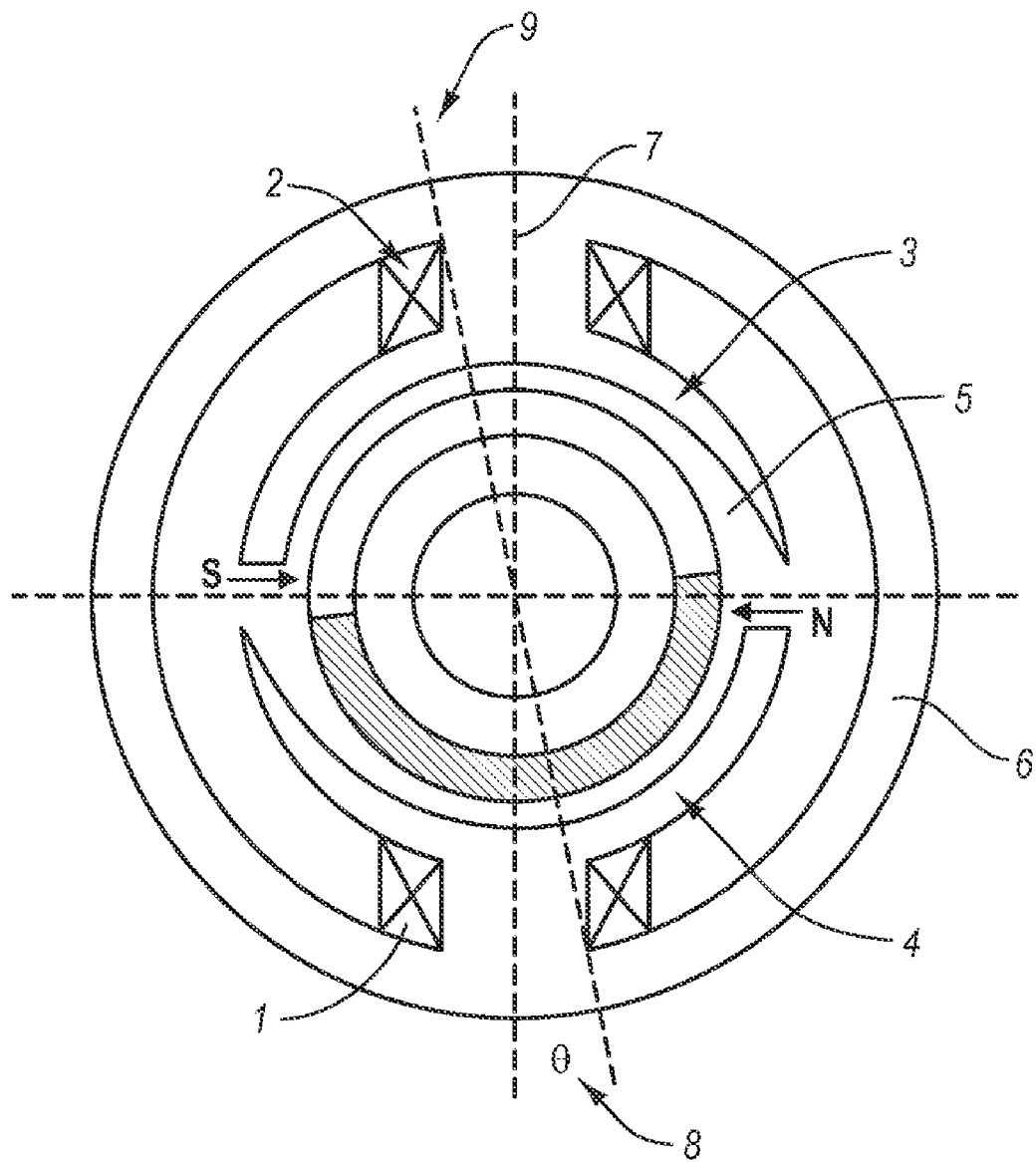
FIG. 11—Single Phase Brushless DC motor with tapered air gap and angular position of the rotor.

Cinematic quantities like the angular displacement θ and the angular speed ω may be computed based on a analysis of the duty cycle signal and timing information provided by a clock. Starting from a first maximum duty cycle as detected by, the filter 240, the content NbMax of a register is incremented and a reference time $t_{Ref}$ is stored. Whenever necessary, the angular displacement can be evaluated based on the value NbMax and the link that exist between the shape of the Bemf signal and the angular position of the rotor. For instance, when the bemf signal varies as illustrated on FIG. 10A, the angular displacement since $t_{Ref}$ will be approximated by (NbMax−)*Π. The angular speed ω may be approximated by (NbMax−1)*Π($t_{NbMax} - t_{ref}$).

The invention claimed is:

1. A control circuit for an electric motor, the electric motor comprising a rotor, a stator and windings, the control circuit having a feedback loop regulator to generate a control signal (TL or TR) to control a current drive circuit to control the amplitude of current ($i_w$) in the windings, the feedback loop regulator being arranged to compare the amplitude of the current ($i_w$) in the windings with a reference value ($i_{set}$), the control circuit also having circuitry to extract a characteristic (DC) of the control signal, said characteristic varying in function of time as the back electromotive force in the windings,
   the control circuitry further having circuitry to determine cinematic quantities and/or to determine the direction of rotation of the motor.

2. The circuit of claim 1 wherein that the feedback loop regulator is a Pulse Width Modulation Regulator.

3. The circuit of claim 1 having circuitry arranged to determine a rotational position of the electric motor based on a characteristic (DC) of the control signal.

4. The circuit of claim 1 having circuitry to determine time instants at which the direction of a current in the stator windings is be changed in function of the variation of a characteristic (DC) of the control signal.

5. The circuit of claim 1 having circuitry to determine a direction of rotation of the motor from a characteristic (DC) of the control signal.

6. The circuit of claim 2 having circuitry to determine a direction of rotation of the motor from a characteristic (DC) of the control signal.

7. The circuit of claim 3 having circuitry to determine a direction of rotation of the motor from a characteristic (DC) of the control signal.

8. The circuit of claim 4 having circuitry to determine a direction of rotation of the motor from a characteristic (DC) of the control signal.

9. The circuit of claim 5 wherein that the circuitry to determine a direction of rotation of the motor comprises means to compute a rate of variation of a characteristic of the control signal.

10. The circuit of claim 6 wherein that the circuitry to determine a direction of rotation of the motor comprises means to compute a rate of variation of a characteristic of the control signal.

11. The circuit of claim 7 wherein that the circuitry to determine a direction of rotation of the motor comprises means to compute a rate of variation of a characteristic of the control signal.

12. The circuit of claim 8 wherein that the circuitry to determine a direction of rotation of the motor comprises means to compute a rate of variation of a characteristic of the control signal.

13. A method for determining the angular position of an electric motor, the motor having windings at a stator and a permanent magnet at the rotor, the amplitude of the current in the windings being controlled by a feedback loop regulator controlling a current drive circuit connected to the windings, the method comprising:
  obtaining a characteristic (DC) of a control signal (TL, TR) generated by the feedback loop regulator; and
  monitoring the characteristic (DC) of the control signal; and
  determining the angular position of the electric motor.

14. The method of claim 13 comprising detecting a maximum in the monitored characteristic (DC) of the control signal.

15. The method of claim 14 wherein the detected maximum in the characteristic (DC) is used to determine the instant at which to invert the direction of the current in the windings.

16. The method of claim 15 wherein the decision to invert the direction of the current in the windings is taken when the characteristic (DC) has decreased by a given amount from the detected maximum.

17. A method for determining a direction of rotation of an electric motor, the motor having windings at a stator and a permanent magnet at a rotor and having asymmetry and/or eccentricity in a profile of back electromotive force as a function of the angular position of the rotor of the motor with respect to the stator of the motor, the amplitude of the current in the windings being controlled by a feedback loop regulator controlling a current drive circuit connected to the windings, the method comprising:
  obtaining a characteristic of a control signal generated by the feedback loop regulator at more than two instants in time; and
  determining a direction of rotation of an electric motor.

18. The method of claim 17 comprising:
  obtaining a first rate of variation of the characteristic of the control signal at a first instant in time; and
  obtaining a second rate of variation of the characteristic of the control signal at a second instant in time.

19. The method of claim 18 wherein that the first rate of variation is obtained before the occurrence of a maximum in the characteristic of the control signal and the second rate of variation is obtained after the occurrence of a maximum in the characteristic of the control signal.

20. The method of claim 18 wherein the first rate of variation is compared to the second rate of variation.

21. The method of claim 20 wherein the first rate of variation is compared to the second rate of variation.

* * * * *